US009288719B2

United States Patent
Hui et al.

(10) Patent No.: US 9,288,719 B2
(45) Date of Patent: Mar. 15, 2016

(54) LINK ADAPTATION FOR A MULTI-HOP ROUTE IN A WIRELESS MESH NETWORK

(71) Applicant: Optis Cellular Technology, LLC, Plano, TX (US)

(72) Inventors: Dennis Hui, Sunnyvale, CA (US); Hugo Tullberg, Nyköping (SE)

(73) Assignee: Optis Cellular Technology, LLC, Plano, TX (US)

( * ) Notice: Subject to any disclaimer, the term of this patent is extended or adjusted under 35 U.S.C. 154(b) by 344 days.

(21) Appl. No.: 14/039,554

(22) Filed: Sep. 27, 2013

(65) Prior Publication Data

US 2014/0092745 A1   Apr. 3, 2014

Related U.S. Application Data

(60) Provisional application No. 61/707,366, filed on Sep. 28, 2012.

(51) Int. Cl.
*H04J 3/08* (2006.01)
*H04W 28/12* (2009.01)
*H04W 28/02* (2009.01)
*H04L 12/801* (2013.01)
(Continued)

(52) U.S. Cl.
CPC .............. *H04W 28/12* (2013.01); *H04L 47/26* (2013.01); *H04L 47/33* (2013.01); *H04L 47/38* (2013.01); *H04W 28/021* (2013.01); *H04W 28/10* (2013.01); *H04L 47/14* (2013.01); *H04W 84/18* (2013.01)

(58) Field of Classification Search
CPC ................................ H04W 28/12; H04L 47/26
See application file for complete search history.

(56) References Cited

U.S. PATENT DOCUMENTS 7,035,220 B1 *  4/2006  Simcoe .................. H04L 47/10
                                              370/236
8,045,463 B2 * 10/2011  Radunovic ............ H04L 45/127
                                              370/231

(Continued)

FOREIGN PATENT DOCUMENTS

WO   2006091377 A2   8/2006
WO   2009113976 A1   9/2009

OTHER PUBLICATIONS

PCT Search Report and Written Opinion mailed Mar. 28, 2014 for Application No. PCT/IB2013/058963 (15 pages).

(Continued)

*Primary Examiner* — Hassan Kizou
*Assistant Examiner* — Abdelnabi Musa

(57) ABSTRACT

Systems and methods for link adaptation for a multi-hop route in a wireless mesh network are disclosed. In one embodiment, a wireless mesh network includes network nodes in a route through the wireless mesh network. The network nodes determine a bottleneck information flow rate for the route based on backward propagation of information indicative of a tentative bottleneck information flow rate for the route from an ending network node to a starting network node through one or more intermediate network nodes. A target information flow rate for the route that is less than or equal to the bottleneck information flow rate for the route is determined. A Modulation and Coding Scheme (MCS) and, in some embodiments, a transmission mode is determined for each network node in the route other than the ending network node based on forward propagation of information indicative of the target information flow rate for the route.

25 Claims, 11 Drawing Sheets

(51) Int. Cl.
*H04L 12/811* (2013.01)
*H04L 12/825* (2013.01)
*H04W 28/10* (2009.01)
*H04W 84/18* (2009.01)

(56) References Cited

U.S. PATENT DOCUMENTS

2012/0106342 A1* 5/2012 Sundararajan ........ H04L 47/193
370/235
2013/0258847 A1* 10/2013 Zhang ..................... H04L 47/22
370/232

OTHER PUBLICATIONS

Chi Hyun Cho, et al.: "Mobile multi-hop relay system using AMC for multicast broadcast service over mobile WiMAX", Wireless Telecommunications Symposium, 2008. WTS 2008, IEEE, Piscataway, NJ, USA, Apr. 24, 2008, pp. 46-52, XP031274983, ISBN: 978-1-4244-1869-5, p. 46, line 1—p. 51, left-hand column, line 4; figure 5 (7 pages).

Ian F. Akyildiz, et al.: "Cross-Layer Design in Wireless Mesh Networks", IEEE Transactions on Vehicular Technology, IEEE Service Center, Piscataway, NJ, US, vol. 57, No. 2, Mar. 1, 2008, pp. 1061-1076, XP011202269, ISSN: 0018-9545, p. 1061, line 1—p. 1075, left-hand column, line 31 (16 pages).

Narayan, et al., "On the advantages of multi-hop extensions to the IEEE 802.111 infrastructure mode," in Proc. WCNC 2005, pp. 132-138, 2005 (7 pages).

Bertsekas et al., "Data Networks," 2nd Edition, Prentice-Hall, Inc., 1992 (574 pages).

Holland et al.,"A Rate-Adaptive MAC Protocol for Multi-Hop Wireless Networks," The Seventh Annual International Conference on Mobile Computing and Networking, Jul. 2001, Rome, Italy, ACM (15 pages).

Yang et al.,"An Enhanced Link Adaptation Strategy for IEEE 802.11 Wireless Ad Hoc Networks," 2007, Seoul, Korea, (5 pages).

Hiertz et al., "IEEE 802.11s: The WLAN Mesh Standard," Feb. 2010, IEEE Wireless Communications (8 pages).

Conner et al., "IEEE 802.11s Tutorial: Overview of the Amendment for Wireless Local Area Mesh Networking," IEEE 802 Plenary, Dallas, Texas, Nov. 13, 2006 (93 pages).

\* cited by examiner

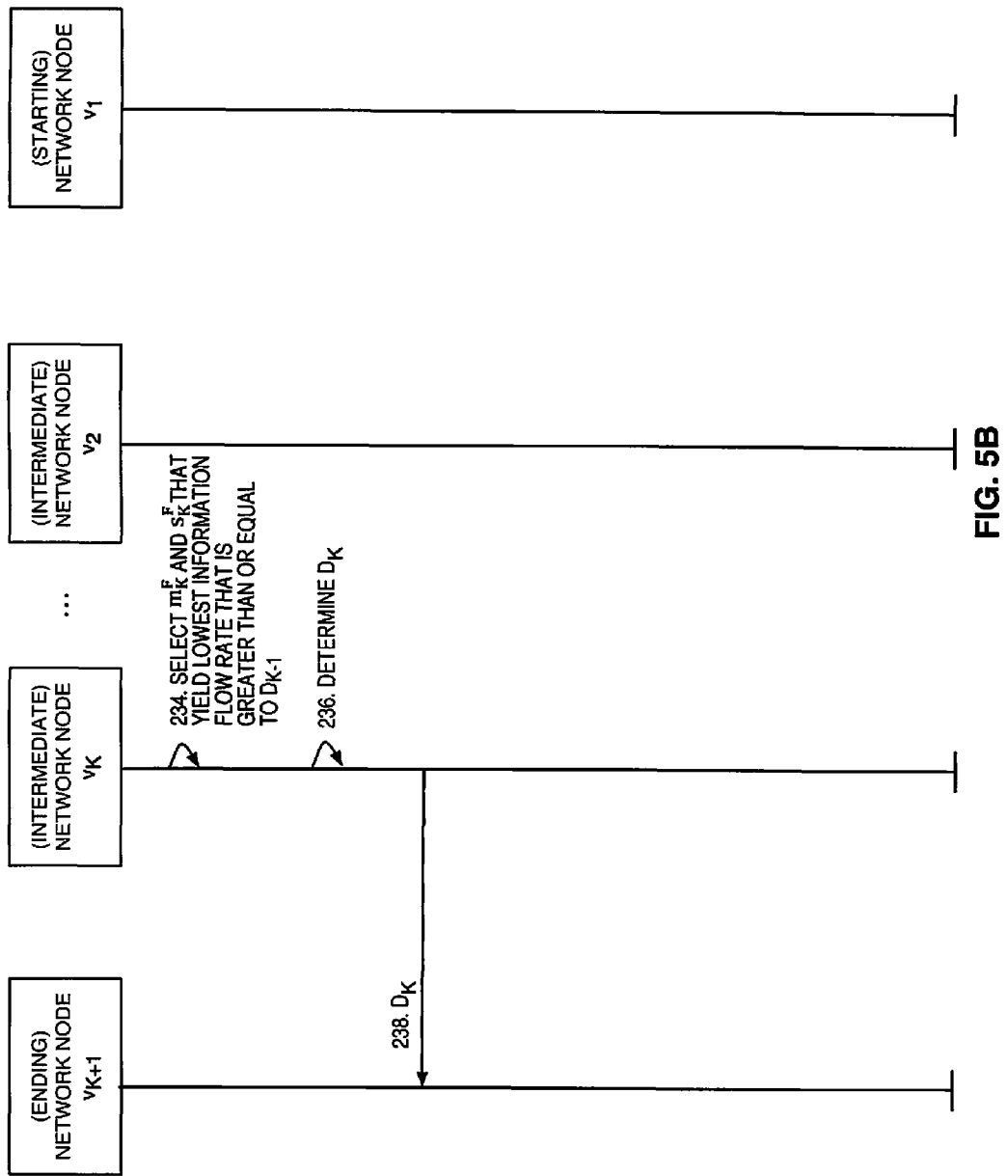

LINK ADAPTATION FOR A MULTI-HOP ROUTE IN A WIRELESS MESH NETWORK

RELATED APPLICATIONS

This application claims the benefit of provisional patent application Ser. No. 61/707,366, filed Sep. 28, 2012, the disclosure of which is hereby incorporated herein by reference in its entirety.

FIELD OF THE DISCLOSURE

The present disclosure relates to a wireless mesh network and more particularly relates to link adaptation for a multi-hop route in a wireless mesh network.

BACKGROUND

The explosive rise in popularity of smart phones has exposed the capacity limitation of current cellular communications networks. The increasing usage of bandwidth-demanding multimedia and social networking applications on mobile devices further exacerbates the problem. To cope with the exponential growth in wireless data traffic, it is anticipated that substantially denser deployment of access nodes will be required in the future. Such a dense deployment may be achieved by gradually augmenting existing base stations with a much denser mix of "smaller," or low power, base stations with reduced signal footprints.

Clearly, the feasibility of a very dense deployment of access nodes is predicated on the existence of a backhaul network that can provide high-data-rate transport for each individual access node in the network. From the viewpoint of maximizing capacity, optical-fiber-based backhaul solutions are probably the most desirable ones and are most suitable for new constructions. However, in existing buildings and infrastructure, the cost of installation of new fibers to every access node in a very dense network can be prohibitive.

An alternative to an optical-fiber-based backhaul solution is a wireless self-backhaul solution where the same access spectrum is used to provide transport. A large amount of bandwidth is expected to be available in high frequency bands (e.g., the Millimeter Wave (MMW) bands) where future wireless systems are likely to be deployed. In addition, these future wireless systems have the potential of a high degree of spatial reuse due to the associated reduced radio wavelengths. Both the large amount of available bandwidth and the high degree of spatial reuse motivate the self-backhauling approach. The simplicity of the wireless self-backhaul approach and the potential of substantially reducing the deployment cost also make the wireless self-backhaul approach very attractive.

As illustrated in FIG. 1, in the wireless self-backhaul approach, an access node (AN) provides network access to user equipment devices (UEs) in its vicinity that are assigned to the access node as well as transport for neighboring access nodes. With regard to transport, the access node operates as a relay node in order to route data toward and/or from an aggregation node. A group of self-backhauling access nodes can form a wireless mesh network, where the access nodes cooperatively route each other's traffic to and from the aggregation node, possibly through multiple "hops." The aggregation node connects the wireless mesh network to a larger network (e.g., a core network of the associated cellular communications network).

Not only does self-backhauling eliminate the need to install additional wires/fibers and hence substantially reduce deployment cost, self-backhauling also provides the ultimate flexibility for users or network operators to deploy access nodes anywhere there is unmet traffic demand. Even in the case when wired (fiber or copper based) backhaul is available, self-backhauling can still serve as a fallback or a diversifying solution to enhance the reliability of the network. However, in order for the self-backhaul solution to be an acceptable substitute for wired backhaul, efficient mechanisms for transferring information from one network node in a wireless mesh network to another network node in the wireless mesh network on a multi-hop route must be designed to ensure adequate end-to-end performance in terms of both data throughput and latency.

Transporting information wirelessly through a wireless mesh network formed by self-backhauling access nodes requires the use of routing algorithms in combination with a routing metric to select which route among all possible routes with one or more hops should be used. Each of these candidate routes consists of an arbitrary but finite number of wireless links, or hops. Common routing algorithms include the Bellman-Ford algorithm and the Dijkstra algorithm, as described in D. P. Bertsekas and R. G. Gallager, "Data Networks," $2^{nd}$ Edition, Prentice Hall, 1992. These algorithms typically find the shortest path (or route), in the sense of yielding the best routing metric value, among all possible paths from a source node to a destination node. Once a desirable route has been identified, an appropriate data transmission rate at an ingress node (e.g., an aggregation node or a UE for a wireless mesh backhaul network) can be set accordingly.

To cope with the dynamically varying nature of wireless channels, each access node typically supports a wide range of data transmission rates derived from a set of different possible combinations of Modulation and Coding Schemes (MCSs). To achieve high throughput performance, the appropriate MCS needs to be adaptively selected by each access node for each link depending on its channel condition. Such an adaptive MCS selection process is commonly referred to as link adaptation.

Traditional link adaptation techniques focus on a single communication link and its associated link quality metric. Some existing link adaptation techniques proposed for multi-hop wireless networks are described in E. Yang et al., "An Enhanced Link Adaptation Strategy for IEEE 802.11 Wireless Ad Hoc Networks," *Proc. International Conference on Wireless Communications, Networking and Mobile Computing (WiCom)*, pp. 1672-1676, September 2007; S. Narayanan et al., "On the advantages of multi-hop extensions to the IEEE 802.111 infrastructure mode," *Proc. WCNC* 2005, pp. 132-138, 2005; W. S. Conner et al., "IEEE 802.11s Tutorial—Overview of the Amendment for Wireless Local Area Mesh Networking," November 2006; G. R. Hiertz et al., "IEEE 802.11s: The WLAN Mesh Standard," IEEE Wireless Communications, pp. 104-111, February 2010; and G. Holland et al., "A Rate-Adaptive Protocol for Multi-hop Wireless Networks," *Proc. ACM MOBICOM* 01, 2001. Existing link adaptation strategies proposed for multi-hop wireless networks, such as those referenced above, essentially reuse the same techniques designed for a single communication link. Specifically, each access node on a route selects the MCS that maximizes the data throughput of the individual wireless link with which the access node is concerned. As a result, MCSs supporting different data rates may be selected for different wireless links of a given route due to the differences in the channel and interference conditions among these links, as described in S. Narayanan et al., "On the advantages of multi-hop extensions to the IEEE 802.111 infrastructure mode," *Proc. WCNC* 2005, pp. 132-138, 2005 and G. Holland et al., "A Rate-Adaptive Protocol for Multi-hop Wireless Networks," *Proc. ACM MOBICOM* 01, 2001. This can lead to packet loss due to buffer overflow at those access nodes whose outgoing data rates are smaller than their respective incoming data rates. Current solutions to this issue rely on flow control and congestion control in the upper layer (e.g., Transmission Control Protocol (TCP)) to back off the transmission rate when the buffer of the receiving network node fills up as described in W. S. Conner et al., "IEEE 802.11s Tutorial—Overview of the Amendment for Wireless Local Area Mesh Networking," November 2006 and G. R. Hiertz et al., "IEEE 802.11s: The WLAN Mesh Standard," IEEE Wireless Communications, pp. 104-111, February 2010. This is particularly costly for the multi-hop self-backhaul solution, as any lost packets may have already traversed several hops, and thus can lead to high latency and unnecessary signaling overhead in the wireless network.

In addition to the potential transmission rate mismatch across different hops, the use of single-hop link adaptation techniques in the multi-hop setting does little to account for the potential inter-hop interference from neighboring links of a route in link adaptation. This can result in an incorrect MCS selection that over-estimates the feasible transmission rate in each hop, which in turn leads to additional delay in re-adjustment of transmission rates through upper-layer protocols. Moreover, the imprudent utilization of radio resources in terms of, for example, transmit power, bandwidth, etc. that leads to the excessively high throughputs in some of the links can also create unnecessarily high interference to other links or routes in the wireless network.

In light of the discussion above, link adaptation techniques for a multi-hop route in a wireless mesh network are desired. In addition, there is a need for link adaptation techniques for a multi-hop route in a wireless mesh network that account for interference.

SUMMARY

Systems and methods for link adaptation for a multi-hop route in a wireless mesh network are disclosed. In one embodiment, a wireless mesh network includes a number of network nodes in a route through the wireless mesh network, where the network nodes in the route include a starting network node, an ending network node, and one or more intermediate network nodes. The network nodes are configured to determine a bottleneck information flow rate for the route based on backward propagation of information indicative of a tentative bottleneck information flow rate for the route from the ending network node to the starting network node through the one or more intermediate network nodes. A target information flow rate for the route that is less than or equal to the bottleneck information flow rate for the route is determined. A Modulation and Coding Scheme (MCS) and, in some embodiments, a transmission mode is determined for each of the network nodes in the route other than the ending network node based on forward propagation of information indicative of the target information flow rate for the route from the starting network node.

In one embodiment, an intermediate network node in a route through a wireless mesh network includes a radio subsystem including a transmitter and a receiver and a processing subsystem. The processing subsystem is configured to receive, from a downstream network node of the network node in the route through the wireless mesh network via the radio subsystem, information that is indicative of one or more tentative bottleneck information flow rates determined by the downstream network node for the route. The processing subsystem is further configured to determine one or more new tentative bottleneck information flow rates for the route based on the one or more tentative bottleneck information flow rates determined by the downstream network node for the route. The processing subsystem is further configured to transmit, to an upstream network node of the network node in the route through the wireless mesh network via the radio subsystem, information that is indicative of the one or more new tentative bottleneck information flow rates for the route. Thereafter, the processing subsystem is configured to receive, from the upstream network node via the radio subsystem, information that is indicative of a target information flow rate for a wireless link from a transmitter of the upstream network node to the receiver of the network node. The processing subsystem is further configured to select an MCS, and in some embodiments a transmission mode, for the transmitter of the radio subsystem of the network node for use when transmitting information over the route in the wireless mesh network that yield a lowest information flow rate that is greater than or equal to the target information flow rate received from the upstream network node.

In one embodiment, the processing subsystem is further configured to transmit to the downstream network node, via the radio subsystem, information that is indicative of a target information flow rate for a wireless link from the transmitter of the network node to a receiver of the downstream network node. In one embodiment, the target information flow rate for the wireless link from the transmitter of the network node to the receiver of the downstream network node is less than or equal to the target information flow rate received from the upstream network node for the wireless link from the transmitter of the upstream network node to the receiver of the network node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 5A and 5B illustrate the operation of network nodes in a route through a wireless mesh network to perform the process of FIGS. 3 and 4 according to one embodiment of the present disclosure;

DETAILED DESCRIPTION

Figure 1:
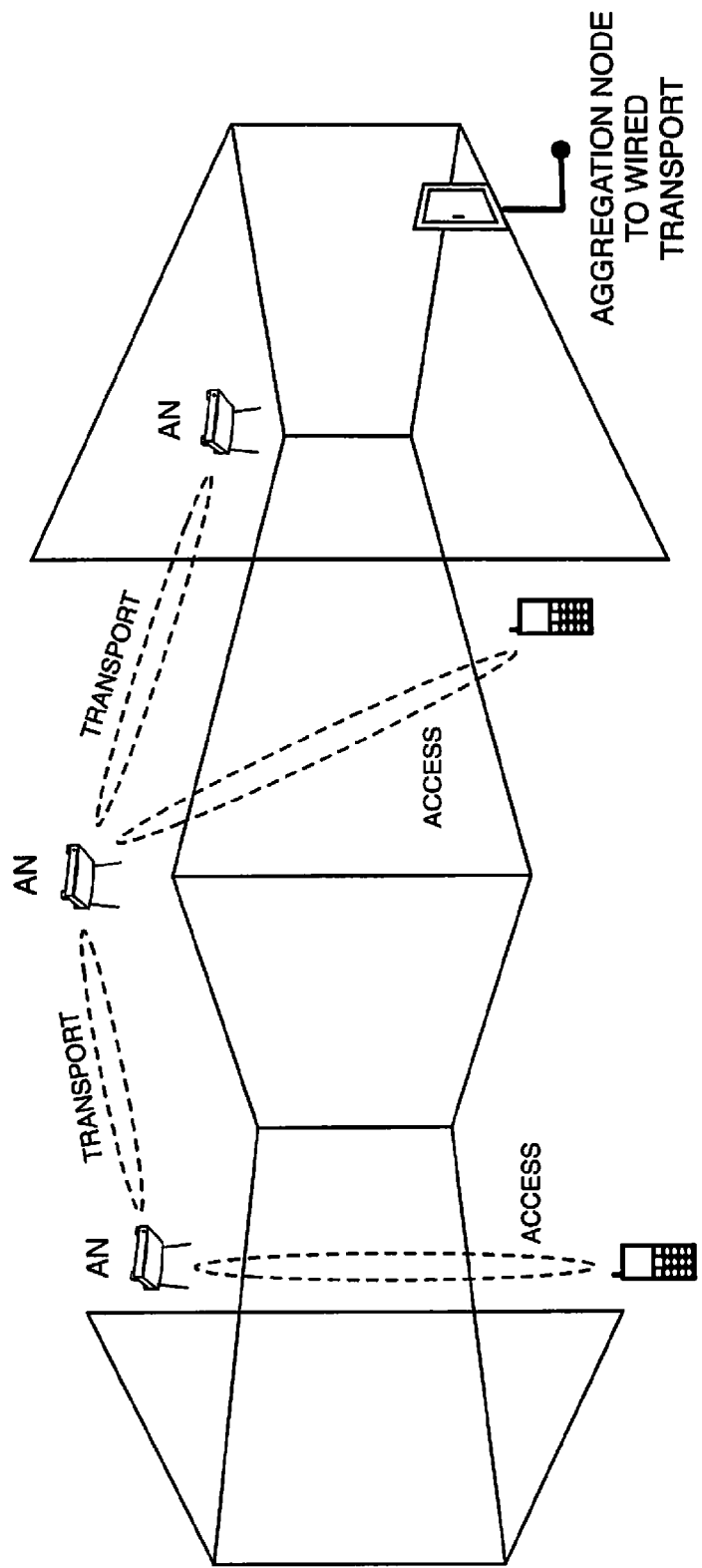
FIG. 1 illustrates a wireless mesh backhaul network for a group of access nodes in a cellular communications network.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for link adaptation for a multi-hop route in a wireless mesh network are disclosed. In general, systems and methods for selecting and maintaining Modulation and Coding Schemes (MCSs) across multiple wireless links on a particular multi-hop route in a wireless mesh network (e.g., a wireless mesh backhaul network) that ensure that individual information flow rates on the different wireless links in the route match well with a maximum achievable end-to-end information flow rate through the route. Before describing embodiments of the present disclosure in detail, a discussion of a model of a wireless mesh network used herein is beneficial.

A wireless mesh network can be modeled as a directed graph $G \equiv (V,E)$, where V denotes a set of graph vertices and E denotes a set of edges, each connecting two vertices in V. Each network node in the wireless mesh network is then represented by a graph vertex $v \in V$, and each (potential) wireless link between two network nodes is represented by an edge $e \in E$. A route from a starting, or source, network node (e.g., an aggregation node of a wireless mesh backhaul network for a group of access nodes in a cellular communications network) to an ending, or destination, network node (e.g., a user terminal or a distant access node) can be represented by a path P in the wireless mesh network. The path P is an ordered (K+1)-tuple $(v_1, \ldots, v_{K+1})$ such that $v_i \in V$ for all i and $(v_i, v_{i+1}) \in E$ for all $i = 1, 2, \ldots, K$, where K denotes the number of edges on the path P, $v_1$ is the starting (or source) vertex, and $v_{K+1}$ is the ending (or terminal) vertex. Information is assumed to flow from the starting vertex to the ending vertex. For any non-starting and non-ending vertex $v_j$ on a path $P = (v_1, \ldots, v_{K+1})$, we refer to $v_{j-1}$ and $v_{j+1}$ as the upstream (or previous) and the downstream (or next) vertex of $v_j$, respectively. For simplicity, vertices, edges, and path will henceforth often (somewhat informally) be referred to as "network nodes," "links," and "route," respectively.

For a given route (or path) $P = (v_1, v_2, \ldots, v_{K+1})$ with K links (or edges), let $\Pi_i$ denote the set of different transmission modes for a transmitting network node $v_i$ of the i-th link (or link i), i.e. $(v_i, v_{i+1}) \in E$. The transmission mode for the i-th link here may represent, for example, a different radio resource (in terms of frequency bands and/or time slots) allocated for the wireless link, which is typically known to both the transmitting network node $v_i$ as well as the receiving network node $v_{i+1}$. In addition, a transmission mode may also represent, for example, a transmit power level, a precoding matrix, beamforming weights, or any combinations thereof.

Let $\mathcal{M}_i(m)$ denote a set of all possible combinations of MCSs for the transmission mode $m \in \Pi_i$ the i-th wireless link. For any MCS $s \in \mathcal{M}_i(m)$ selected for the transmission mode $m \in \Pi_i$. $R_i(s,m)$ denote a corresponding true information flow rate over the i-th wireless link. Here, the information flow rate is determined by an average rate of information bits (excluding coded bits) successfully received by the receiving network node regardless of whether any re-transmission scheme is used. Conventional MCS selection methods typically find the MCS $s_i(m)$ for the i-th link that maximizes the information flow rate of that wireless link only independent of all other links on the route, i.e. computing, for the i-th link:

$$s_i(m_i) \equiv \underset{s \in \mathcal{M}_i(m_i)}{\operatorname{argmax}} \ R_i(s, m_i), \tag{1}$$

for a given transmission mode $m_i \in \Pi_i$.

Figure 2:
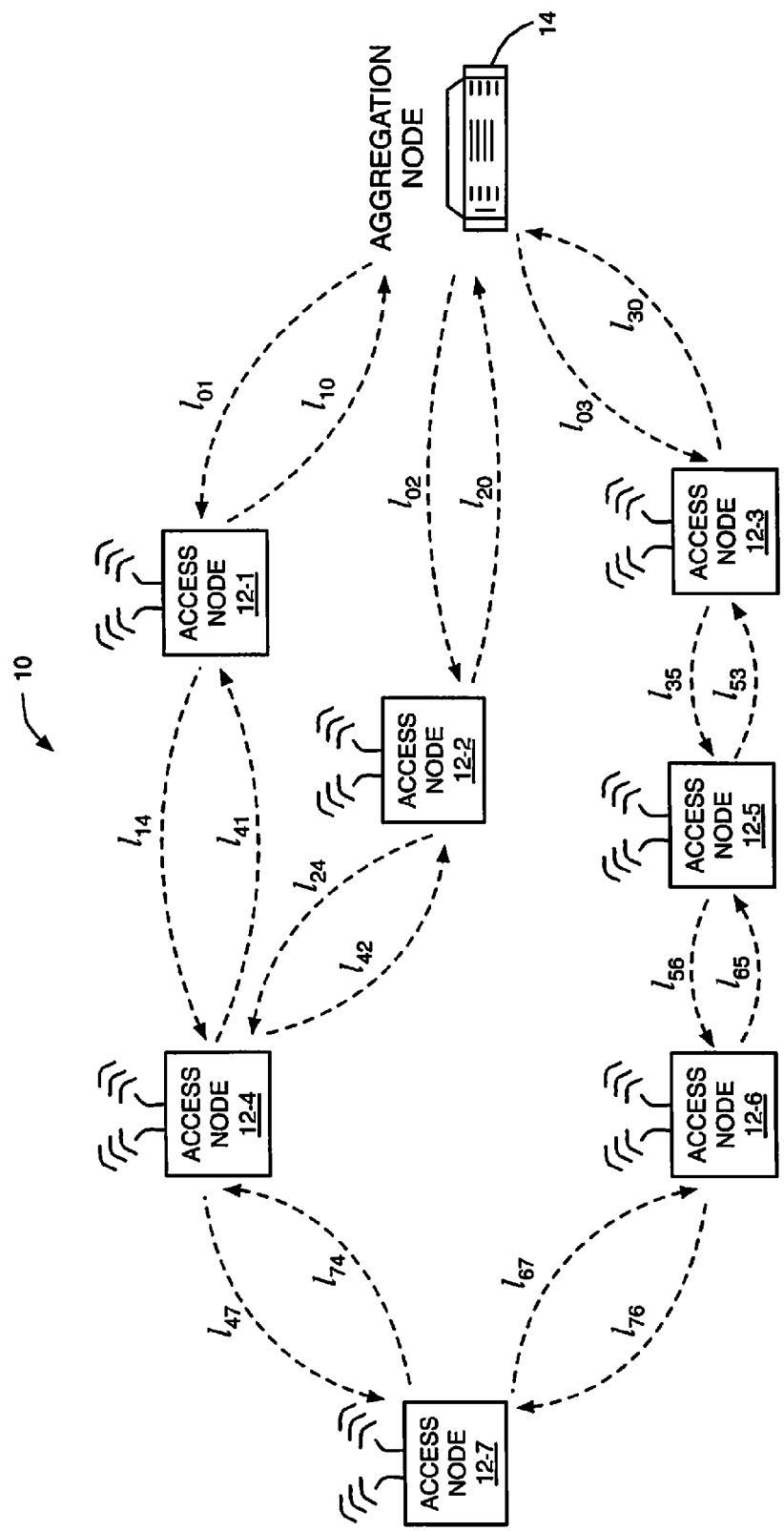
FIG. 2 illustrates a wireless mesh backhaul network for a group of access nodes in a cellular communications network for transmission modes and Modulation and Coding Schemes (MCSs), are selected for wireless links in a route through the wireless mesh backhaul network according to one embodiment of the present disclosure.

Systems and methods are disclosed herein for selecting the MCSs and, in the preferred embodiments disclosed herein, the transmission modes for all individual wireless links of a multi-hop route through a wireless mesh network to ensure that the information flow rates of individual wireless links are compatible with a maximized end-to-end information throughput. While the concepts disclosed herein are not limited to any particular type of wireless mesh network, in one embodiment, the concepts disclosed herein are utilized in a wireless mesh backhaul network 10 for a number of access nodes 12-1 through 12-7 (generally referred to herein collectively as access nodes 12 and individually as access node 12) providing access to a cellular communications network, as illustrated in FIG. 2. Each access node 12 has a wireless link (l), or a potential wireless link, between a transmitter of the access node 12 and a receiver of one or more neighboring access nodes 12 in the wireless mesh backhaul network 10. In this context, a neighboring access node 12 is another access node 12 with which the access node 12 is capable of establishing a wireless link (l). The wireless links are also simply referred to herein as links. The access nodes 12 are connected to an external network (e.g., a core network of the cellular communications network) via an aggregation node 14. As discussed below in detail, for a desired route through the wireless mesh backhaul network 10, MCSs, and preferably transmission modes, for each of the wireless links in the route (or in other words MCSs, and preferably transmission modes, for the transmitters of each of the wireless links in the route) are selected in such a manner that the information flow rates of individual wireless links are compatible with a maximized end-to-end information throughput for the route.

Figure 3:
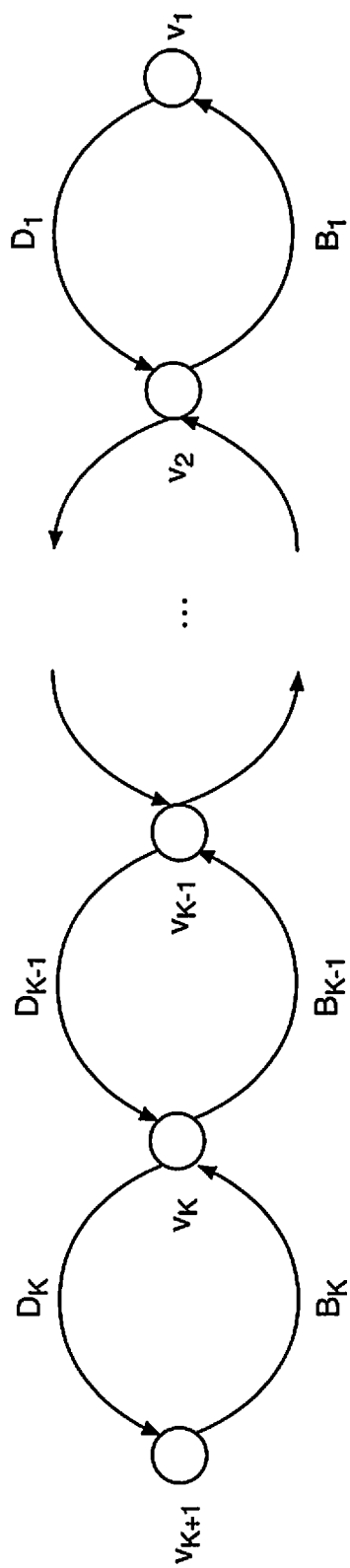
FIG. 3 illustrates a process for utilizing reverse propagation of tentative Bottleneck Information Flow Rates (BIFRs) and forward propagation of target Information Arrival Rates (IARs) to select transmission modes and MCSs for network nodes in a wireless mesh network such as the wireless mesh backhaul network of FIG. 2 according to one embodiment of the present disclosure.

FIG. 3 graphically illustrates a process for selecting MCSs and transmissions modes for each of the wireless links in a route through a wireless mesh network, such as for instance the wireless mesh backhaul network 10 of FIG. 2, according to one embodiment of the present disclosure. As illustrated, the route P includes a number of network nodes $v_i$ for i=1, 2, ..., K+1 (i.e., $P=(v_1, v_2, ..., v_{K+1})$). The route P is a multi-hop route where K≥2. In this process, MCSs $s_i$ and transmission modes $m_i$ are selected for the wireless links $(v_i, v_{i+1})$ for the non-ending, or transmitting, network nodes in the route P (i.e., the network nodes $v_i$ for i=1, 2, ..., K.

Before proceeding, a description of a few terms utilized herein is beneficial. As used herein, a Bottleneck Information Flow Rate (BIFR) is a data rate or data throughput achievable on a bottleneck link of a given route. In contrast, a tentative BIFR is a temporary variable that is propagated through network nodes in the given route in order for a starting, or source, network node of the route to determine the bottleneck information flow rate for the entire route. As used herein, an Information Arrival Rate (IAR) at a given network node is a data rate or data throughput of the link between the network node and its upstream network node. In other words, the IAR is the data rate arriving at the network node. Lastly, as used herein, a Target Information Flow Rate (TIFR) at a network node is an actual data rate or data throughput of the link between the network node and its downstream network node. In other words, the TIFR is the data rate leaving the network node.

The process includes a backward propagation phase and a forward propagation phase. In the backward propagation phase, a tentative Bottleneck Information Flow Rate (BIFR) is propagated from the ending network node $v_{K+1}$ of the route P to the starting network node $v_1$ of the route P, where the tentative BIFR is updated by the intermediate network nodes $v_K$, ..., $v_2$ along the way. Thus, as illustrated, the ending network node $v_{K+1}$ determines a tentative BIFR $B_K$ for the route P. As discussed below in detail, in one embodiment, the ending network node $v_{K+1}$ determines the tentative BIFR $B_K$ based on an estimated Information Arrival Rate (IAR) at the ending network node $v_{K+1}$ via the link $(v_K, v_{K+1})$ from the network node $v_K$ to the ending network node $v_{K+1}$. The ending network node $v_{K+1}$ transmits information indicative of the tentative BIFR $B_K$ (e.g., the tentative BIFR $B_K$ or a corresponding MCS index) to the network node $v_K$. The network node $v_K$ then determines a new tentative BIFR $B_{K-1}$ based on the tentative BIFR $B_K$ and, in one embodiment, an estimated IAR at the network node $v_K$ via the link $(v_{K-1}, v_K)$ from the network node $v_{K-1}$ to the network node $v_K$. In other words, the network node $v_K$ updates the tentative BIFR $B_K$ determined by the ending network node $v_{K+1}$ to thereby provide the new tentative BIFR $B_{K-1}$. The network node $v_K$ then transmits information indicative of the tentative BIFR $B_{K-1}$ (e.g., the tentative BIFR $B_{K-1}$ or a corresponding MCS index) to the network node $v_{K-1}$. Backward propagation continues in this manner until the starting network node $v_1$ receives information indicative of a tentative BIFR $B_1$ from the network node $v_2$.

At that point, the tentative BIFR $B_1$ received by the starting network node $v_1$ is a BIFR for the route P. The starting network node $v_1$ selects an MCS and a transmission mode for the link $(v_1, v_2)$ from the starting network node $v_1$ to the network node $v_2$ that yield a maximum information flow rate over the link $(v_1, v_2)$ that is less than or equal to the tentative BIFR $B_1$ (i.e., the BIFR for the route P) as the MCS and the transmission mode for the link $(v_1, v_2)$ (i.e., the MCS and the transmission mode for the transmitter of the starting network node $v_1$ for the link $(v_1, v_2)$). A Target Information Flow Rate (TIFR) for the route P is then defined as the maximum information flow rate over the link $(v_1, v_2)$ that is less than or equal to the tentative BIFR $B_1$ (i.e., the BIFR for the route P) as yielded by the selected MCS and the transmission mode for the link $(v_1, v_2)$ The TIFR for the route P, as determined by the starting network node $v_1$, is denoted as $D_1$.

Next, during the forward propagation phase, information that is indicative of the TIFR is propagated in a forward direction through the route P from the starting network node $v_1$ to the ending network node $v_{K+1}$, or as discussed below the upstream network node $v_K$ of the ending network node $v_{K+1}$. As the information indicative of the TIFR is propagated, the network nodes $v_i$ for i=2, ..., K select MCSs and transmission modes for their corresponding wireless links $(v_i, v_{i+1})$ based on the TIFR and, in some embodiments, update the TIFR. More specifically, as illustrated, the starting network node $v_1$ transmits information that is indicative of the TIFR $D_1$ (e.g., the TIFR $D_1$ or a corresponding MCS index) determined by the starting network node $v_1$ to the network node $v_2$. The network node $v_2$ then selects an MCS and a transmission mode for the link $(v_2, v_3)$ based on the TIFR $D_1$ received from the starting network node $v_1$. As discussed below, the MCS and the transmission mode selected by the network node $v_2$ for the link $(v_2, v_3)$ are the MCS and the transmission mode that yield a lowest information flow rate over the link $(v_2, v_3)$ that is greater than or equal to the TIFR $D_1$ received from the starting network node $v_1$. The network node $v_2$ then determines a TIFR $D_2$ and transmits information indicative of the TIFR $D_2$ to its downstream network node. The TIFR $D_2$ determined by the network node $v_2$ is preferably a function of the TIFR and, more specifically, may be less than or equal to the TIFR $D_1$.

Forward propagation continues in this manner until the network node $v_K$ receives information indicative of a TIFR $D_{K-1}$ from the network node $v_{K-1}$. The network node $v_K$ then selects an MCS and a transmission mode for the link $(v_K, v_{K+1})$ based on the TIFR $D_{K-1}$ received from the network node $v_{K-1}$. As discussed below, the MCS and the transmission mode selected by the network node $v_K$ for the link $(v_K, v_{K+1})$ are the MCS and the transmission mode that yield a lowest information flow rate over the link $(v_K, v_{K+1})$ that is greater than or equal to the TIFR $D_{K-1}$ received from the network node $v_{K-1}$. Optionally, the network node $v_K$ then determines a TIFR $D_K$ and transmits information indicative of the TIFR $D_K$ to its downstream network node, which is the ending network node $v_{K+1}$. The TIFR $D_K$ determined by the network node $v_K$ is preferably a function of the TIFR $D_{K-1}$ and, more specifically, may be less than or equal to the TIFR $D_{K-1}$. Note that, in this embodiment, the ending network node $v_{K+1}$ can use the TIFR $D_K$ to derive which MCS is chosen by the network node $v_K$. In an alternative embodiment, the network node $v_K$ does not determine the TIFR $D_K$ nor does it transmit information indicative of the TIFR $D_K$ to its downstream network node, which is the ending network node $v_{K+1}$. In this alternative embodiment, the MCS chosen by the network node $v_K$ is transmitted to the ending network node $v_{K+1}$ so that the ending network node $v_{K+1}$ knows which MCS to use for the link $(v_K, v_{K+1})$. At this point, MCSs and transmission modes for all of the wireless links in the route P have been selected and, as such, the process is complete.

Figure 4:
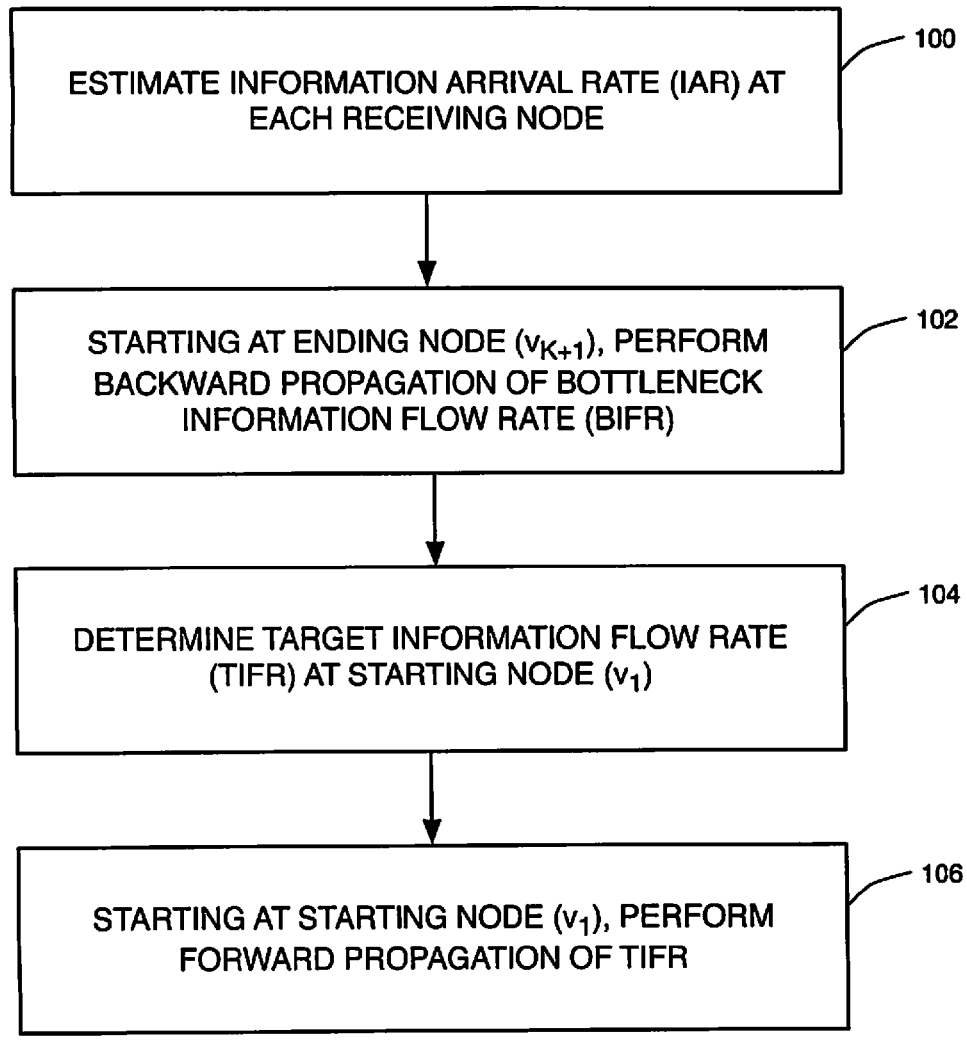
FIG. 4 is a flow chart that illustrates the process of FIG. 3 in more detail according to one embodiment of the present disclosure.

FIG. 4 is a flow chart that illustrates the process of FIG. 3 in more detail according to one embodiment of the present disclosure. In this embodiment, prior to starting the process, each non-starting network node $v_j$ (for j=2, 3, ..., K+1) of a given route $P=(v_1, v_2, ..., v_{K+1})$ independently determines an initial transmission mode $m_{j-1}^I \in \Pi_{j-1}$ and a corresponding initial MCS $s_{j-1}^I \in \mathcal{M}(m_{j-1}^I)$ for its incoming link $(v_{j-1}, v_j)$ according to, for example, Equation (1). For instance, each of the network nodes (other than the ending network node $v_{K+1}$) may determine or otherwise obtain the initial transmission mode for that network node. The initial MCSs for the network nodes may then be determined based on their initial transmission modes according to Equation (1). Each network node may be aware or be made aware of the initial MCS and the initial transmission mode of the upstream network node of that network node. So, each non-starting network node $v_j$ (for j=2, 3, ..., K+1) is aware or made aware of the initial transmission mode $m_{j-1}^I$ and the initial MCS $s_{j-1}^I$ of the upstream network node $v_{j-1}$ of the network node $v_j$.

Each non-starting network node $v_j$ (for j=2, 3, ..., K+1) of the route P estimates an IAR $A_j$ at the non-starting network node $v_j$ for the wireless link $(v_{j-1},v_j)$ from the upstream network node $v_{j-1}$ of the non-starting network node $v_j$ to the non-starting network node $v_j$ (step 100). More specifically, in one embodiment, the non-starting network node $v_j$ determines the IAR $A_j$ at the non-starting network node $v_j$ according to:

$$A_j = R_{j-1}(s_{j-1}^I, m_{j-1}^I) \quad (2)$$

where $R_{j-1}(\bullet)$ is a predefined function that defines an information flow rate for the wireless link $(v_{j-1},v_j)$ based on the MCS and the transmission mode of the wireless link $(v_{j-1},v_j)$. The function $R_{j-1}(\bullet)$ can be any suitable function for defining the information flow rate for a wireless link for the particular wireless communication technology used for the wireless link. As one non-limiting example, let $SINR(m_{j-1}^I)$ denote an estimated Signal-to-Interference-plus-Noise Ratio (SINR) on the wireless link $(v_{j-1},v_j)$ resulted from the use of the particular transmission mode $m_{j-1}^I$ (which may present a transmit power, a transmit beam direction, or a frequency slot over which the signal is transmitted), $\Lambda(s_{j-1}^I)$ denote the signal constellation (e.g., Quadrature Phase Shift Keying (QPSK) or 16 Quadrature Amplitude Modulation (16QAM), etc.) used by the MCS $s_{j-1}^I$, the function $R_{j-1}(\bullet)$ may be chosen as the information-theoretic capacity of the wireless link $(v_{j-1},v_j)$ with a finite constellation given by $$R_{j-1}(s_{j-1}^I, m_{j-1}^I) \equiv \log|\Lambda(s_{j-1}^I)| - \frac{1}{|\Lambda(s_{j-1}^I)|} \sum_{c_1 \in \Lambda(s_{j-1}^I)} \int \frac{e^{-|z|^2/2}}{2\pi} \log_2 \sum_{c_2 \in \Lambda(s_{j-1}^I)} e^{-SINR(m_{j-1}^I)|c_1-c_2|^2/2} e^{-\sqrt{SINR(m_{j-1}^I)} \, Re\{z^*(c_1-c_2)\}} dz$$

where $|\Lambda(s_{j-1}^I)|$ denotes the number of points in the signal constellation $\Lambda(s_{j-1}^I)$.

Notably, Equation (2) does not take into account the potential mutual interference caused by transmission mode selection made by neighboring network nodes along the route P. In this context, a neighboring network node for a non-starting network node $v_j$ for j=2, ..., K+1 is another network node that may or may not be in the route P whose transmissions interfere or potentially interfere with reception at the network node $v_j$ from its upstream network node $v_{j-1}$ via the wireless link $(v_{j-1},v_j)$. As such, in another embodiment, each non-starting network node $v_j$ determines the corresponding IAR $A_j$ at the non-starting network node $v_j$ in a manner that accounts for a worst-case interference from its neighboring network nodes.

In particular, the IAR $A_j$ over any given link $(v_{j-1},v_j)$ may depend not only on the transmission mode $m_{j-1}$ and the associated MCS $s_{j-1}$ selected for the network node $v_{j-1}$ for the corresponding link $(v_{j-1},v_j)$, but also on the transmission modes used by its neighboring network nodes. More precisely, let $$\sigma_{j-1} \equiv (m_{(j-1)-p_{j-1}}, m_{j-p_{j-1}}, \ldots, m_{j-2}, m_{j+1}, \quad (3)$$
$$m_{j+2}, \ldots, m_{j+q_{j-1}-2}, m_{(j-1)+q_{j-1}}) \in \underset{\substack{k=(j-1)-p_{j-1}\\k\neq(j-1)}}{\overset{k=(j-1)+q_{j-1}}{\times}} \Pi_k$$

where $$\Pi_{(j-1)-p_j} \times \ldots \times \Pi_{j-2} \times \Pi_j \times \ldots \times \Pi_{(j-1)+q_j} \equiv \underset{\substack{k=(j-1)-p_j\\k\neq(j-1)}}{\overset{k=(j-1)+q_j}{\times}} \Pi_k \quad (4)$$

be a vector whose elements are the transmission modes of $(p_{j-1}+q_{j-1})$ neighboring network nodes of the network node $v_j$, excluding $v_{j-1}$, that affects a link quality of the wireless link $(v_{j-1},v_j)$, where $p_{j-1}$ and $q_{j-1}$ are non-negative integers representing a number of preceding neighboring network nodes and a number of succeeding neighboring network nodes. The proper MCS $s_{j-1}$ for the wireless link $(v_{j-1},v_j)$ in general depends not only on the MCS $m_{j-1}$ selected for the transmitter of the network node $v_{j-1}$ but also on $\sigma_{j-1}$, while the maximum attainable information flow rate of the wireless link $(v_{j-1},v_j)$ depends on $m_{j-1}$, $\sigma_{j-1}$, and $s_{j-1}$.

By assuming that the worst choices are made for the MCSs and the transmission modes for the neighboring network nodes, the IAR $A_j$ for the network node $v_j$ over the wireless link $(v_{j-1},v_j)$ is computed. More precisely, for each non-starting network node $v_j$ for j=2, ..., K+1, the non-starting network node $v_j$ computes the IAR $A_j$ for the incoming wireless link $(v_{j-1},v_j)$ from the upstream network node $v_{j-1}$ of the non-starting network node $v_j$ as $$A_j = R_{j-1}(s_{j-1}^I(m_{j-1}^I), m_{j-1}^I, \sigma_{j-1}^I(m_{j-1}^I)) \quad (5)$$

where $R_{j-1}(s_{j-1}, m_{j-1}, \sigma_{j-1})$ denotes the information flow rate of wireless link $(v_{j-1},v_j)$ given that the transmission mode $m_{j-1}$ and the MCS $s_{j-1}$ are chosen at the network node $v_{j-1}$ and that transmission modes specified by $\sigma^{j-1}$ are chosen by the neighboring network nodes of $v_j$. Further, $R_{j-1}(s_{j-1}^I(m_{j-1}^I), m_{j-1}^I, \sigma_{j-1}^I(m_{j-1}^I))$ denotes the maximum information flow rate $R_{j-1}$ under the worst-case interference scenario. More specifically, the transmission mode $m_{j-1}^I$ is an independently determined initial transmission mode for the wireless link $(v_{j-1},v_j)$ the MCS $s_{j-1}^I(m_{j-1}^I)$ is an MCS that yields a maximum information flow rate $R_{j-1}$ considering a worst-case transmission mode vector for the initial transmission mode $m_{j-1}^I$, and $\sigma_{j-1}^I(m_{j-1}^I)$ is the worst-case transmission mode vector for the initial transmission mode $m_{j-1}^I$. In one particular embodiment, $s_{j-1}^I(m_{j-1}^I)$ and $\sigma_{j-1}^I(m_{j-1}^I)$ are defined as:

$$s_{j-1}^I(m_{j-1}^I) \equiv \underset{s \in M_{j-1}(m_{j-1}^I)}{\operatorname{argmax}} R_{j-1}(s, m_{j-1}, \sigma_{j-1}^I(m_{j-1}^I)), \quad (6)$$

and $$\sigma_{j-1}^I(m_{j-1}^I) \equiv \underset{\substack{\sigma \in \underset{k=(j-1)-p_{j-1}}{\overset{(j-1)+q_{j-1}}{\times}} \Pi_k\\k\neq(j-1)}}{\operatorname{argmin}} \underset{s \in M_{j-1}(m_{j-1}^I)}{\operatorname{max}} R_{j-1}(s, m_{j-1}^I, \sigma) \quad (7)$$

for the initial transmission mode.

Regardless of how the IARs $\{A_j\}_{j=2}^{K+1}$ are computed, as discussed above, the network nodes $v_j$ for j=K+1 to j=2 determine and propagate a tentative BIFR for the route P in the backward direction such that the tentative BIFR $B_1$ received by the starting network node $v_1$ is the BIFR for the route P (step 102). More specifically, to begin the backward propagation process, the ending network node $v_{K+1}$ first determines a tentative BIFR $B_{K+1}$ according to, for example, a rate of information processing or consumption at the ending network node $v_{K+1}$. When there is no limit on the information processing or consumption rate of the network node $v_{K+1}$, the tentative BIFR $B_{K+1}$ may be set to a very large predetermined number. The network node $v_{K+1}$ then computes a new tentative BIFR $B_K$ according to $$B_K = \min\{B_{K+1}, A_{K+1}\} \qquad (8)$$

and transmits, or sends, information indicative of the new tentative BIFR $B_K$ to its upstream network node $v_K$ through the wireless link $(v_{K+1}, v_K)$. For each intermediate network node $v_j$ from j=K back to j=2, upon receipt of the tentative BIFR $B_j$ from its downstream network node $v_{j+1}$, network node $v_j$ computes a new tentative BIFR $B_{j-1}$ based on the tentative BIFR $B_j$ and the IAR $A_j$ at the network node $v_j$ and transmits, or sends, information indicative of the new tentative BIFR $B_{j-1}$ to its upstream network node $v_{j-1}$ via the wireless link $(v_j, v_{j-1})$. In one embodiment, the intermediate network node $v_j$ computes the new tentative BIFR $B_{j-1}$ according to $$B_{j-1} \equiv \min\left\{\frac{B_j}{(1-\varepsilon_j)}, A_j\right\} \qquad (9)$$

where $\varepsilon_j \in [0,1]$ is a value, referred to herein as an information dropping probability of the network node $v_j$, that denotes a target probability of an information bit received by the network node $v_j$ from the upstream network node $v_{j-1}$ being dropped by the network node $v_j$ due to a failure in transferring the received information bit to the downstream network node $v_{j+1}$. For example, if an Automatic Repeat Request (ARQ) or Hybrid ARQ (HARQ) re-transmission scheme is used in the link $(v_j, v_{j+1})$, an information bit may be dropped due to repeated failure of passing a Cyclic Redundancy Check (CRC) code at the downstream network node $v_{j+1}$ after a number of pre-determined re-transmissions. If an unacknowledged mode is used, an information bit may be considered dropped by the network node $v_j$ if the corresponding coded block fails to pass CRC for the first time. An information bit may also be dropped due to buffer overflow at the network node $v_j$. Upper layer re-transmission protocol may be needed to transmit the dropped information bits. In most cases, $\varepsilon_j$ may be set to zero or close to zero. In another embodiment, the intermediate network node $v_j$ computes the new tentative BIFR $B_{j-1}$ according to $$B_{j-1} \equiv \min\{B_j, A_j\} \qquad (10)$$

where Equation (10) is a special case of Equation (9) where $\varepsilon_j = 0$.

Note that the information indicative of the tentative BIFR $B_K$ transmitted from the ending network node $v_{K+1}$ to its upstream network node $v_K$ may be the tentative BIFR $B_K$ or information that is representative of the tentative BIFR $B_K$ such as, for example, an index of the MCS $s_K' \in \mathcal{M}_K(m_K)$ that achieves the highest rate $R_K(s_K', m_K)$ that is smaller than or equal to the tentative BIFR $B_K$. Likewise, the information indicative of the tentative BIFR $B_{j-1}$ transmitted from the intermediate network node $v_j$ to its upstream network node $v_{j-1}$ may be the tentative BIFR $B_{j-1}$ or information that is representative of the tentative BIFR $B_{j-1}$ such as, for example, an index of the MCS $s_{j-1}' \in \mathcal{M}_{j-1}(m_{j-1})$ that achieves the highest rate $R_{j-1}(s_{j-1}', m_{j-1})$ that is smaller than or equal to the tentative BIFR $B_{j-1}$. The backward propagation process continues until the starting network node $v_1$ receives the tentative BIFR $B_1$ from the network node $v_2$.

Once backward propagation is complete, the starting network node $v_1$ determines the TIFR for the route P at the starting network node $v_1$ (step 104). More specifically, the starting network node $v_1$ selects a final transmission mode $m_1^F \in \Pi_1$ and a corresponding final MCS $s_1^F \in \mathcal{M}_1(m_1^F)$ for the wireless link $(v_1, v_2)$ as those that yield the highest information flow rate $$D_1 = R_1(s_1^F, m_1^F) \qquad (11)$$

that is smaller than or equal to the tentative BIFR $B_1$. The information flow rate $D_1$ is the TIFR for the route P at the starting network node $v_1$ (i.e., $D_1$ is referred to as the TIFR $D_1$ for the route P at the starting network node $v_1$).

After the starting network node $v_1$ determines the TIFR $D_1$, the TIFR $D_1$ is propagated, via a forward propagation process, from the starting network node $v_1$ through the route P stopping at the ending network node $v_{K+1}$, or possibly the network node $v_K$ depending on the particular implementation (step 106). More specifically, the starting network node $v_1$ transmits information indicative of the TIFR $D_1$ to its downstream network node $v_2$ as the forward propagation stage commences. Then, for each intermediate network node $v_j$ from j=2 to j=K, upon on receipt of $D_{j-1}$, the intermediate network node $v_j$ determines a final transmission mode $m_j^F \in \Pi_j$ and a corresponding final MCS $s_j^F \in \mathcal{M}_j(m_j^F)$ for the link $(v_j, v_{j+1})$ as those that yield the lowest rate $R_j(s_j^F, m_j^F)$ that is larger than or equal to the TIFR at its upstream network node $v_{j-1}$. The final transmission mode $m_j^F$ and the final MCS $s_j^F$ are selected as the transmission mode and the MCS for the wireless link $(v_j, v_{j+1})$. In one embodiment, the intermediate network node $v_j$ then computes a new, or updated, TIFR $D_j$ as $$D_j = (1 - \varepsilon_j) D_{j-1} \qquad (12)$$

where again $\varepsilon_j \in [0,1]$ denotes the target probability of a received information bit being dropped by $v_j$ due to failure in transferring it to the downstream network node $v_{j+1}$. As stated above, in most cases, $\varepsilon_j$ may be set to zero or close to zero. In another embodiment, the new TIFR $D_j$ is set equal to the TIFR $D_{j-1}$ at the upstream network node $v_{j-1}$.

The intermediate network node $v_j$ transmits information indicative of the new TIFR $D_j$ to its downstream network node $v_{j+1}$. The information indicative of the new TIFR $D_j$ transmitted to the downstream network node $v_{j+1}$ is either the new TIFR $D_j$ to information that represents the new TIFR $D_j$ such as, for example, indices of $m_j^F \in \Pi_j$ and $s_j^F \in \mathcal{M}_j(m_j^F)$. The forward propagation process repeats until the ending node $v_{K+1}$ receives the TIFR $D_K$ or, alternatively, until the network node $v_K$ receives the TIFR $D_{K-1}$ and processes the TIFR $D_{K-1}$ to select final transmission mode $m_K^F \in \Pi_K$ and a corresponding final MCS $s_K^F \in \mathcal{M}_K(m_K^F)$ for the link $(v_K, v_{K+1})$ as those that yield the lowest rate $R_K(s_K^F, m_K^F)$ that is larger than or equal to the TIFR $D_{K-1}$. Note that the final transmission mode $m_j^F \in \Pi_j$ and the corresponding final MCS $s_j^F \in \mathcal{M}_j(m_j^F)$ can be derived at the downstream network node $v_{j+1}$ from the TIFR $D_j$, assuming that the downstream network node $v_{j+1}$ knows $\Pi_j$ and $\mathcal{M}_j(m)$ for all $m \in \Pi_j$ as it should be. From Equation (12), it is easy to show by induction that $D_j \leq B_j$ for all j=1, 2, ..., K, which implies from Equation (12) that $$D_j \leq A_{j+1} \text{ for all } j=1,2,\ldots,K \qquad (13)$$

which ensures that information bits can flow through each wireless link of the route P without continually accumulating at any of the non-starting network nodes $\{v_j\}_{j=2}^{K}$.

As noted above, according to one preferred embodiment, the information indicative of the TIFR $D_j$ transmitted from network node $v_j$ to its downstream network node $v_{j+1}$, for $j=1, 2, \ldots, K$, is indices of $m_j^F \in \Pi_j$ and $s_j^F \in \mathcal{M}_j(m_j^F)$, where the downstream network node knows $\Pi_j$ and $\mathcal{M}_j(m)$ for all $m \in \Pi_j$. In this case, for $j=2, 3, \ldots, K$, the network node $v_j$ computes $D_{j-1} \equiv R_{j-1}(s_{j-1}^F, m_{j-1}^F)$, which can be viewed as an approximation of $D_1$, and determines $m_j^F$ and for the link $(v_j, v_{j+1})$ as those that yield the lowest rate $R_j(s_j^F, m_j^F)$ that is larger than or equal to $D_{j-1}$. It can be shown that if, during the backward propagation, transmitting of the information indicative of the tentative BIFR $B_{j-1}$ at the network node $v_j$ is also accomplished by transmitting an index of the MCS $s_{j-1}' \in \mathcal{M}_{j-1}(m_{j-1})$ that achieves the highest rate $R_{j-1}(s_{j-1}', m_{j-1})$ that is smaller than or equal to $B_{j-1}$, as described above, then transmitting TIFR in this manner will also fulfill $$D_{j-1} \le A_j \text{ for all } j=2,3,\ldots,K+1 \quad (14)$$

which ensures that information bits can flow through each wireless link of the route P without continually accumulating at any of the non-starting network nodes $\{v_j\}_{j=2}^{K}$.

Figure 5A:
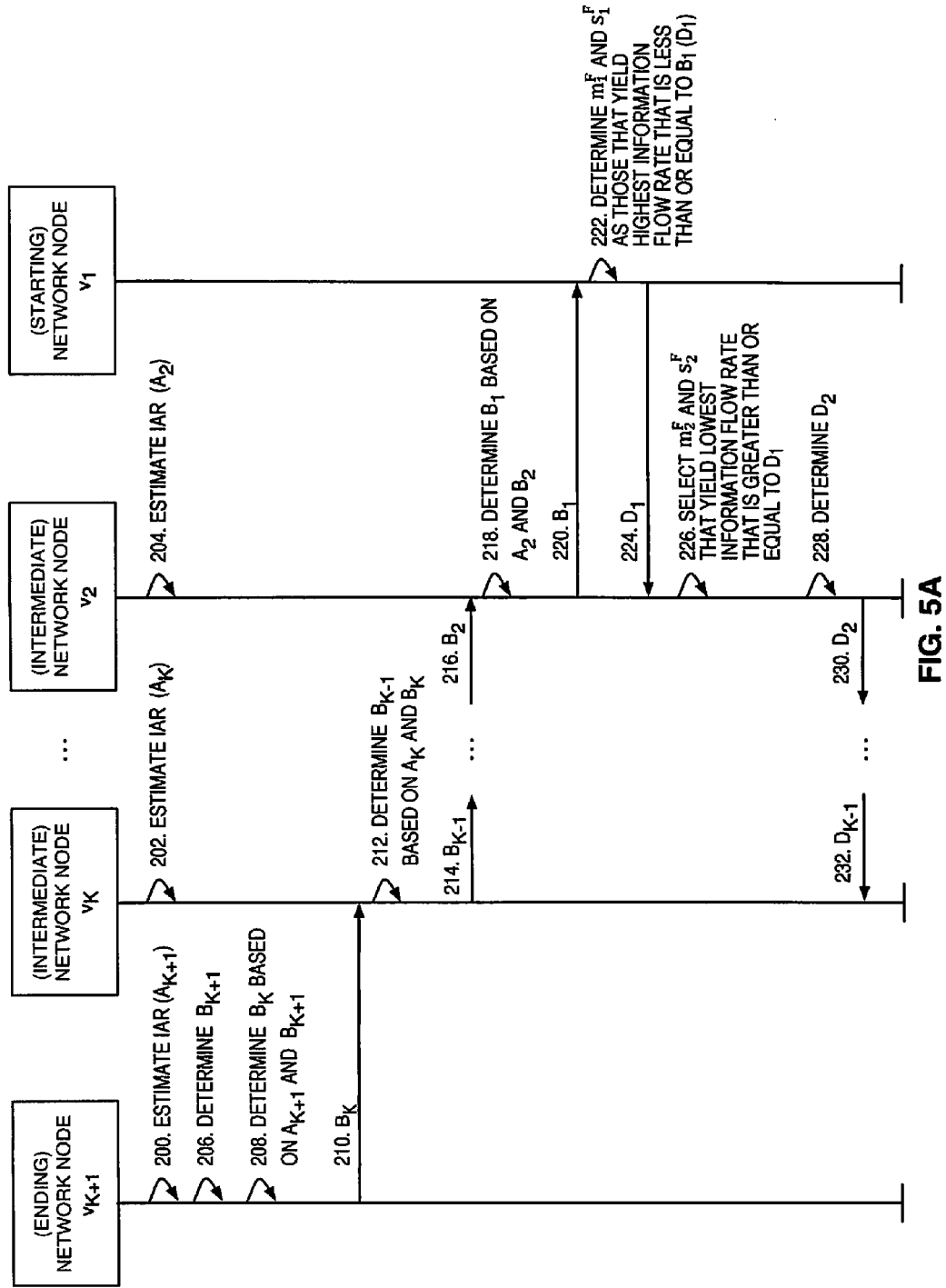

FIGS. 5A and 5B illustrate the operation of the network nodes $\{v_j\}_{j=1}^{K+1}$ in a route $P=(v_1, v_2, \ldots, v_{K+1})$ to perform the process of FIGS. 3 and 4 according to one embodiment of the present disclosure. Again, the route P is a multi-hop route (i.e., $K \ge 2$). As illustrated, the non-starting network nodes $\{v_j\}_{j=2}^{K+1}$ estimate the IARs $\{A_j\}_{j=2}^{K+1}$ as discussed above with respect to step 100 of FIG. 4 (steps 200-204). More specifically, in one embodiment, each non-starting network node $v_j$ determines the IAR $A_j$ at the non-starting network node $v_j$ according to Equation (2). In another embodiment, each non-starting network node $v_j$ determines the IAR $A_j$ at the non-starting network node $v_j$ according to the worst-case interference scenario as discussed above with respect to Equations (3) through (7).

Using the estimated IAR $A_{K+1}$, the ending network node $v_{K+1}$ determines a tentative BIFR $B_{K+1}$ for the route P (step 206). As discussed above, the ending network node $v_{K+1}$ determines the tentative BIFR $B_{K+1}$ according to, for example, a rate of information processing or consumption at the ending network node $v_{K+1}$. When there is no limit on the information processing or consumption rate of the ending network node $v_{K+1}$, the tentative BIFR $B_{K+1}$ may be set to a very large predetermined number. The ending network node $v_{K+1}$ then determines a new tentative BIFR $B_K$ for the route P based on the tentative BIFR $B_{K+1}$ and the estimated IAR $A_{K+1}$ at the ending network node $v_{K+1}$ (step 208). More specifically, as discussed above, the ending network node $v_{K+1}$ determines the new tentative BIFR $B_K$ for the route P according to Equation (8) such that the new tentative BIFR $B_K$ is the minimum of the tentative BIFR $B_{K+1}$ and the IAR $A_{K+1}$. The ending network node $v_{K+1}$ then transmits information indicative of the tentative BIFR $B_K$ to its upstream network node $v_K$ (step 210).

The network node $v_K$ then determines a new BIFR $B_{K-1}$ for the route P based on the tentative BIFR $B_K$ received from the ending network node $v_{K+1}$ and the estimated IAR $A_K$ at the network node $v_K$ (step 212). More specifically, as discussed above, the network node $v_K$ determines the tentative BIFR $B_{K-1}$ according to either Equation (9) or Equation (10) such that the tentative BIFR $B_{K-1}$ is less than or equal to the minimum of the tentative BIFR $B_K$ and the estimated IAR $A_K$ at the network node $v_K$. The network node $v_K$ then transmits information indicative of the tentative BIFR $B_{K-1}$ to its upstream network node $v_{K-2}$ (step 214). The process continues in this manner such that, after backward propagation of the tentative BIFR for the route P through zero or more additional intermediate network nodes $v_j$ in the route P, the network node $v_2$ receives a tentative BIFR $B_2$ from its downstream network node $v_3$ (step 216). The network node $v_2$ determines a tentative BIFR $B_1$ based on the tentative BIFR $B_2$ and the estimated IAR $A_2$ at the network node $v_2$ (step 218). Again, the network node $v_2$ determines the tentative BIFR $B_1$ according to either Equation (9) or Equation (10) such that the tentative BIFR $B_1$ is less than or equal to the minimum of the tentative BIFR $B_2$ and the estimated IAR $A_2$ at the network node $v_2$. The network node $v_2$ then transmits information indicative of the tentative BIFR $B_1$ to its upstream network node, which is the starting network node $v_1$ (step 220).

At this point, backward propagation is complete, and the tentative BIFR $B_1$ is the final BIFR for the route P. The starting network node $v_1$ then determines the TIFR for the route P at the starting network node $v_1$ (step 222). More specifically, the starting network node $v_1$ selects a final transmission mode $m_1^F \in \Pi_1$ and a corresponding final MCS $s_1^F \in \mathcal{M}_1(m_1^F)$ for the wireless link $(v_1, v_2)$ as those that yield the highest information flow rate that is smaller than or equal to the tentative BIFR $B_1$ (i.e., the BIFR of the route P). This highest information flow rate that is smaller than or equal to the tentative BIFR $B_1$ is the TIFR for the route P at the starting network node $v_1$, which is denoted as the TIFR $D_1$. The starting network node $v_1$ then transmits information indicative of the TIFR $D_1$ to its downstream network node $v_2$ as the forward propagation stage commences (step 224).

The network node $v_2$ then selects a final transmission mode $m_2^F \in \Pi_2$ and a corresponding final MCS $s_2^F \in \mathcal{M}_2(m_2^F)$ for the link $(v_2, v_3)$ as those that yield the lowest information flow rate $R_2(s_2^F, m_2^F)$ that is larger than or equal to the TIFR $D_1$ (step 226). The network node $v_2$ then determines the TIFR $D_2$ (step 228). As discussed above, the TIFR $D_2$ is equal to or less than the TIFR $D_1$. The network node $v_2$ then transmits information indicative of the TIFR $D_2$ to its downstream network node $v_3$ (step 230). This process continues such that the network node $v_K$ receives the TIFR $D_{K-1}$ from its upstream network node $v_{K-1}$ (step 232). The network node $v_K$ then selects a final transmission mode $m_K^F \in \Pi_K$ and a corresponding final MCS $s_K^F \in \mathcal{M}_K(m_K^F)$ for the link $(v_K, v_{K+1})$ as those that yield the lowest information flow rate $R_K(s_K^F, m_K^F)$ that is larger than or equal to the TIFR $D_{K-1}$ (step 234). In this embodiment, the network node $v_K$ then determines the TIFR $D_K$ and transmits information indicative of the TIFR $D_K$ to its downstream network node, which is the ending network node $v_{K+1}$ (steps 236 and 238). As discussed above, the TIFR $D_K$ is equal to or less than the TIFR $D_{K-1}$. Since the ending network node $v_{K+1}$ is the last network node in the route P, steps 236 and 238 are optional.

In the embodiments above, interference is either not considered or only the worst-case interference scenario is considered. However, in another embodiment, all transmission modes $\{m_j\}_{j=1}^{K}$ and the associated MCSs $\{s_j\}_{j=1}^{K}$ on the route P are jointly optimized to take into account mutual interference among adjacent nodes in order to maximize the end-to-end information flow rate. In this embodiment, during backward propagation, each non-starting network node $v_j$ for $j=2, \ldots, K+1$ determines and sends multiple tentative BIFRs (instead of just a single tentative BIFR) for different hypotheses of the combination of transmission modes selected by the network node $v_j$ itself and its neighboring network nodes. Each tentative BIFR determined by the network node $v_j$ is for a different hypothesis of the combination of transmission modes selected by the network node $v_j$ itself and its neighboring network nodes. The propagation of the extra tentative BIFRs enables the starting network node $v_1$ to make the best decision as to which combination of the transmission modes would yield the largest end-to-end information flow rate over the route P.

For notational simplicity, for an incoming wireless link $(v_{j-1}, v_j)$ to a non-starting network node $v_j$ from its upstream network node $v_{j-1}$, let $$\overline{\sigma}_{j-1} \equiv (m_{(j-1)-p_j}, m_{j-p_j}, \ldots, m_{j+q_j-2}, m_{(j-1)+q_j}) \in \underset{k=(j-1)-p_j}{\overset{k=(j-1)+q_j}{\times}} \Pi_k \quad (15)$$

be a vector whose elements are the transmission modes of the $(p_j+q_j+1)$ consecutive neighboring network nodes of the network node $v_j$ (including $v_{j-1}$) that effect the link quality of the incoming wireless link $(v_{j-1}, v_j)$, where $p_j$ and $q_j$ are non-negative integers. In other words, $\overline{\sigma}_{j-1}$ simply combines $\sigma_{j-1}$ and $m_{j-1}$ into a single vector. Accordingly, let $R_{j-1}(s_{j-1}, \overline{\sigma}_{j-1})$ denote the information flow rate of the incoming wireless link $(v_{j-1}, v_j)$ given that the transmission modes specified by $\overline{\sigma}_{j-1}$ are chosen by the network node and the neighboring network nodes of the network node $v_j$.

Figure 6:
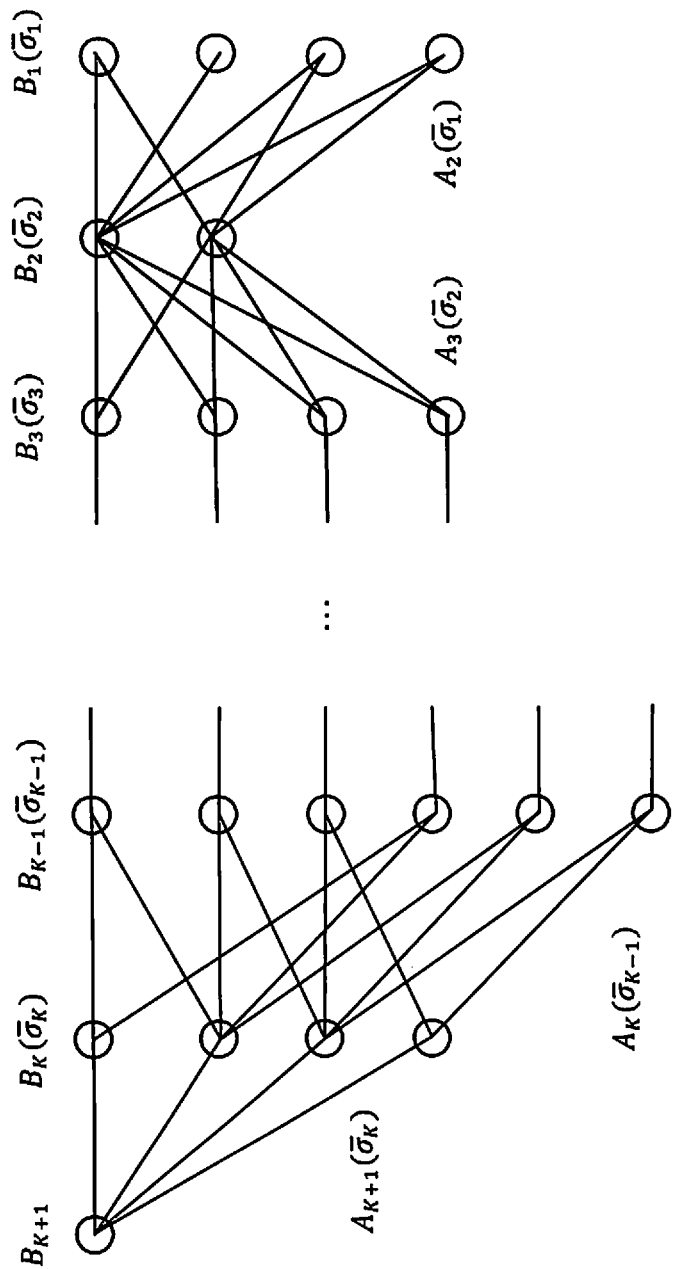
FIG. 6 illustrates a trellis that represents a process for utilizing reverse propagation of a number of BIFRs for different interference scenarios and forward propagation of target IARs to jointly optimize transmission modes and MCSs for network nodes in a wireless mesh network such as the wireless mesh backhaul network of FIG. 2 according to another embodiment of the present disclosure.

This embodiment is best described by a trellis of states with possibly different numbers of states per stage, as depicted in FIG. 6, where the (j−1)th stage of the trellis corresponds to the network node $v_{j-1}$, and each state of the (j−1)th stage corresponds to $\overline{\sigma}_{j-1}$, which represents a hypothesized combination of transmission modes selected by the network node $v_{j-1}$ and the neighboring network nodes of the network node $v_j$, for $j=1, 2, \ldots, K$. An edge exists between two states, $\overline{\sigma}_{j-1}$ and $\overline{\sigma}_j$, in two different trellis stages if and only if the two states, $\overline{\sigma}_{j-1}$ and $\overline{\sigma}_j$, are consistent in the sense that the transmission modes of those network nodes common to both $\overline{\sigma}_{j-1}$ and $\overline{\sigma}_j$ are identically specified by $\overline{\sigma}_{j-1}$ and $\overline{\sigma}_j$.

In this embodiment, the process includes a backward propagation process, or stage, and a forward propagation process, or stage. More specifically, in a manner similar to that described above, each non-starting network node $v_j$ (for $j=2, 3, \ldots, K+1$) of a given route $P=(v_1, v_2, \ldots, v_{K+1})$ independently computes or otherwise determines a table $\{A_j(\overline{\sigma}_{j-1})\}_{\overline{\sigma}_{j-1}}$ of estimated IARs at the network node $v_j$ for its incoming wireless link $(v_{j-1}, v_j)$. Each entry of the table $\{A_j(\overline{\sigma}_{j-1})\}_{\overline{\sigma}_{j-1}}$ corresponds to a different hypothesis of the transmission mode vector $\overline{\sigma}_{j-1} \in \times_{k=j-1-p_j}^{j-1+q_j} \Pi_k$, where $$A_j(\overline{\sigma}_{j-1}) \equiv R_{j-1}(s_{j-1}^I(\overline{\sigma}_{j-1}), \overline{\sigma}_{j-1}), \quad (16)$$

$$s_{j-1}^I(\overline{\sigma}_{j-1}) \equiv \underset{s \in M_{j-1}(m_{j-1})}{\operatorname{argmax}} R_{j-1}(s, \overline{\sigma}_{j-1}) \quad (17)$$

and where $m_{j-1}$ is specified by one of the component in $\overline{\sigma}_{j-1}$.

To begin the backward propagation process, the ending network node $v_{K+1}$ first determines a tentative BIFR $B_{K+1}$ according to, for example, the rate of information processing or consumption at the ending network node $v_{K+1}$. When there is no limit on the information processing or consumption rate of the ending network node $v_{K+1}$, the tentative BIFR $B_{K+1}$ may be set to a very large predetermined number. Then, for each hypothesis of $\overline{\sigma}_K$ the ending network node $v_{K+1}$ computes or otherwise determines a new tentative BIFR $B_K(\overline{\sigma}_K)$ according to $$B_K(\overline{\sigma}_K) = \min\{B_{K+1}, A_{K+1}(\overline{\sigma}_K)\} \quad (18)$$

for each hypothesis of $\overline{\sigma}_K$ at stage K of the trellis. The ending network node $v_{K+1}$ then transmits information indicative of the table $\{B_K(\overline{\sigma}_K)\}$ of tentative BIFRs for all hypothesized $\overline{\sigma}_K$ to its upstream network node $v_K$.

For each subsequent network node $v_j$ from j=K back to j=2, upon receipt of the table $\{B_j(\overline{\sigma}_j)\}$ of tentative BIFRs, the network node $v_j$ computes or otherwise determines a new tentative BIFR $B_{j-1}(\overline{\sigma}_{j-1})$ for each hypothesis of $\overline{\sigma}_{j-1}$ at stage j−1 based on the table $\{B_j(\overline{\sigma}_j)\}$ of tentative BIFRs to thereby provide a new table $\{B_{j-1}(\overline{\sigma}_{j-1})\}$ of tentative BIFRs for all hypothesized transmission mode vectors $\overline{\sigma}_{j-1}$. In one embodiment, the network node $v_j$ computes or otherwise determines a new tentative BIFR $B_{j-1}(\overline{\sigma}_{j-1})$ for each hypothesis of $\overline{\sigma}_{j-1}$ at stage j−1 according to $$B_{j-1}(\overline{\sigma}_{j-1}) \equiv \underset{\sigma_j \in J(\overline{\sigma}_{j-1})}{\max} \left\{ \min\left\{ \frac{B_j(\overline{\sigma}_j)}{(1-\varepsilon_j)}, A_j(\overline{\sigma}_{j-1}) \right\} \right\} \quad (19)$$

$$= \min\left\{ \frac{\underset{\sigma_j \in J(\overline{\sigma}_{j-1})}{\max} B_j(\overline{\sigma}_j)}{(1-\varepsilon_j)}, A_j(\overline{\sigma}_{j-1}) \right\},$$

$$= \min\left\{ \frac{B_j(\tilde{\sigma}_j^F(\overline{\sigma}_{j-1}))}{(1-\varepsilon_j)}, A_j(\overline{\sigma}_{j-1}) \right\}$$

for each hypothesis of $\overline{\sigma}_{j-1}$ at stage j−1 to thereby provide a new table $\{B_j(\overline{\sigma}_{j-1})\}$ for all hypothesized transmission mode vectors $\overline{\sigma}_{j-1}$. Per Equation (19), for each hypothesis of $\overline{\sigma}_{j-1}$, the corresponding tentative BIFR $B_{j-1}(\overline{\sigma}_{j-1})$ is determined based on the hypotheses of $\overline{\sigma}_j \in J(\overline{\sigma}_{j-1})$, where $J(\overline{\sigma}_{j-1})$ denotes the set of all states at stage j (i.e., the set of all $\overline{\sigma}_j$) that are consistent with $\overline{\sigma}_{j-1}$ and where $\tilde{\sigma}_j^F(\overline{\sigma}_{j-1})$ is computed as $$\tilde{\sigma}_j^F(\overline{\sigma}_{j-1}) \equiv \underset{\sigma_j \in J(\overline{\sigma}_{j-1})}{\operatorname{argmax}} B_j(\overline{\sigma}_j). \quad (20)$$

In one embodiment, $\{\tilde{\sigma}_j^F(\overline{\sigma}_{j-1})\}_{\overline{\sigma}_{j-1}}$ is implemented as a network node index table and is stored at the network node $v_j$. Thus, according to Equations (19) and (20), for each hypothesis of $\overline{\sigma}_{j-1}$, the corresponding tentative BIFR $B_{j-1}(\overline{\sigma}_{j-1})$ is the lesser of the maximum BIFR $B_j(\overline{\sigma}_j)$ across all $\overline{\sigma}_j$ that are consistent with $\overline{\sigma}_{j-1}$ divided by $1-\varepsilon_j$ and the estimated IAR $A_j(\overline{\sigma}_{j-1})$ at the network node $v_j$. Therefore, for each hypothesized transmission mode vector $\overline{\sigma}_{j-1}$, the network node $v_j$ finds the best-case tentative BIFR for that hypothesized transmission mode vector $\overline{\sigma}_{j-1}$. Note that Equations (19) and (20) are just one example. In another embodiment, the network node $v_j$ computes or otherwise determines a new tentative BIFR $B_{j-1}(\overline{\sigma}_{j-1})$ for each hypothesis of $\overline{\sigma}_{j-1}$ at stage j−1 according to $$B_{j-1}(\overline{\sigma}_{j-1}) \equiv \underset{\sigma_j \in J(\overline{\sigma}_{j-1})}{\max} \{\min\{B_j(\overline{\sigma}_j), A_j(\overline{\sigma}_{j-1})\}\} \quad (21)$$

$$= \min\left\{ \underset{\sigma_j \in J(\overline{\sigma}_{j-1})}{\max} B_j(\overline{\sigma}_j), A_j(\overline{\sigma}_{j-1}) \right\},$$

$$= \min\{B_j(\tilde{\sigma}_j^F(\overline{\sigma}_{j-1})), A_j(\overline{\sigma}_{j-1})\}$$

for each hypothesis of $\overline{\sigma}_{j-1}$ at stage j−1 to thereby provide a new table $\{B_{j-1}(\overline{\sigma}_{j-1})\}$ for all hypothesized transmission mode vectors $\overline{\sigma}_{j-1}$. Equation (21) is a special case of Equation (19) where $\varepsilon_j=0$.

Once the table $\{B_j(\overline{\sigma}_j)\}$ of tentative BIFRs is determined, the network node $v_j$ transmits information indicative of the table $\{B_j(\overline{\sigma}_j)\}$ of tentative BIFRs to its upstream network node $v_{j-1}$. Note that information indicative of the table $\{B_j(\overline{\sigma}_j)\}$ of tentative BIFRs may be either the tentative BIFR $B_{j-1}(\overline{\sigma}_{j-1})$ values or information that represents the tentative BIFR $B_{j-1}(\overline{\sigma}_{j-1})$ values. For instance, each tentative BIFR $B_{j-1}(\overline{\sigma}_{j-1})$ may be signaled via an index of a corresponding MCS $s_{j-1}{'}(\overline{\sigma}_j) \in \Pi_{j-1}$ that achieves the highest rate $R(s_{j-1}{'}(\overline{\sigma}_{j-1}), \overline{\sigma}_{j-1})$ that is smaller than or equal to $B_{j-1}(\overline{\sigma}_{j-1})$. The forward propagation process continues until the starting network node $v_1$ receives a table $\{B_1(\overline{\sigma}_1)\}$ of tentative BIFRs from its downstream network node $v_2$.

At this point, the starting network node $v_i$ determines, for each state $\overline{\sigma}_1$ at stage 1, an MCS $s_1(\overline{\sigma}_1)$ that yields the highest rate $R_1(s_1(\overline{\sigma}_1), \overline{\sigma}_1)$ that is smaller than $B_1(\overline{\sigma}_1)$, i.e., $$s_1(\overline{\sigma}_1) \equiv \underset{s \in \mathcal{M}(m_1): R(s, \overline{\sigma}_1) \le B_1(\overline{\sigma}_1)}{\operatorname{argmax}} R_1(s, \overline{\sigma}_1) \quad (22)$$

where $m_1$ is specified by one of the components in $\overline{\sigma}_1$. The starting network node $v_1$ then determines or selects a final transmission mode vector $\overline{\sigma}_1^F \in \Pi_1$ and a corresponding MCS $s_1^F \equiv s_1(\overline{\sigma}_1^F)$ for the first wireless link $(v_1, v_2)$ as those that yield the highest information flow rate $$D_1 \equiv \max_{\overline{\sigma}_1} R_1(s_1(\overline{\sigma}_1), \overline{\sigma}_1) = R_1(s_1^F, \overline{\sigma}_1^F) \quad (23)$$

among all possible states at stage 1, where $$\overline{\sigma}_1^F \equiv \underset{\overline{\sigma}_1}{\operatorname{argmax}} R_1(s_1(\overline{\sigma}_1), \overline{\sigma}_1) \quad (24)$$

The information flow rate $D_1$ is a TIFR for the route P at the starting network node $v_1$.

After the TIFR $D_1$ and the final transmission mode vector $\overline{\sigma}_1^F$ are determined at the starting network node $v_1$, the starting network node $v_1$ transmits information indicative of the TIFR $D_1$ and information indicative of the final transmission mode $\overline{\sigma}_1^F$ to its downstream network node $v_2$ as the forward propagation stage commences. Every subsequent network node $v_j$, from $j=2$ to $j=K$, upon on receipt of the TIFR $D_{j-1}$ and the final transmission mode vector $\overline{\sigma}_{j-1}^F$ from its upstream network node $v_{j-1}$, determines a final transmission mode vector $\overline{\sigma}_j^F \equiv \tilde{\sigma}_j^F(\overline{\sigma}_{j-1}^F)$ (and thus the final transmission mode $m_j^F \in \Pi_j$ as specified by one of the component of $\overline{\sigma}_j^F$) for the wireless link $(v_j, v_{j+1})$ using the node index table $\{\tilde{\sigma}_j^F(\overline{\sigma}_{j-1})\}_{\overline{\sigma}_{j-1}}$ stored at the network node $v_j$ and the corresponding MCS $s_j^F \in \mathcal{M}(m_j^F)$ that yield the lowest information flow rate $R_j(s_j^F, \overline{\sigma}_j^F)$ that is larger than or equal to $D_{j-1}$. In one embodiment, the network node $v_j$ then computes a new, or updated, TIFR $D_j$ as $$D_j = (1 - \epsilon_j) D_{j-1}. \quad (25)$$

However, in another embodiment, the new TIFR $D_j$ is equal to the TIFR $D_{j-1}$. More generally, the new TIFR is equal to or less than the TIFR $D_{j-1}$. The network node $v_j$ then transmits the new TIFR $D_j$ and the final transmission mode vector $\overline{\sigma}_j^F$ to its downstream network node $v_{j+1}$. The process repeats until either the ending network node $v_{K+1}$ receives the TIFR $D_K$ or the network node $v_K$ receives the TIFR $D_{K-1}$ and the final transmission mode vector $\overline{\sigma}_{K-1}^F$ from its upstream network node $v_{K-1}$ and processes the TIFR $D_{K-1}$ and the final transmission mode vector $\overline{\sigma}_{K-1}^F$ to determine the transmission mode $m_K^F \in \Pi_K$ and the corresponding MCS $s_K^F$. Note that, for each network node $v_j$, the final transmission mode $m_j^F \in \Pi_j$ and the corresponding MCS $s_j^F$ can be derived at its downstream network node $v_{j+1}$ from the TIFR $D_j$, where the downstream network node $v_{j+1}$ knows $\Pi_j$ and $\mathcal{M}_j(m)$ for all $m \in \Pi_j$.

From Equation (19) (and likewise Equation (21)), it is easy to show by induction that $D_j \le B_j(\overline{\sigma}_j^F)$ for all $j=1, 2, \ldots, K$, which implies from Equation (19) (and likewise Equation (21)) that:

$$D_j \le A_{j+1}(\overline{\sigma}_{j+1}^F) \text{ for all } j=1,2,\ldots,K \quad (26)$$

which ensures that information bits can flow through each wireless link of the route P without continually accumulating at any of the non-starting network nodes $\{v_j\}_{j=2}^K$.

As discussed above, in one preferred embodiment, the information indicative of the TIFR $D_j$ and $\overline{\sigma}_j^F$ transmitted from the network node $v_j$ to its downstream network node $v_{j+1}$, for $j=1, 2, \ldots, K$, may be the indices of $\overline{\sigma}_j^F$ and $s_j^F$. In this case, for $j=2, 3, \ldots, K$, the network node $v_j$ computes or otherwise determines $D_{j-1} \equiv R_{j-1}(s_{j-1}^F, \overline{\sigma}_{j-1}^F)$, which can be viewed as an approximation of $D_j$, and determines $\overline{\sigma}_j^F$ and $s_j^F$ for the link $(v_j, v_{j+1})$ as those that yields lowest information flow rate $R_j(s_j^F, \overline{\sigma}_j^F)$ that is larger than or equal to $D_{j-1}$. It can be shown that if, during the backward propagation, the information indicative of each tentative BIFR $B_{j-1}(\overline{\sigma}_{j-1})$ in the table $\{B_{j-1}(\overline{\sigma}_{j-1})\}_{\overline{\sigma}_{j-1}}$ of tentative BIFRs transmitted from the network node $v_j$ to its upstream network node $v_{j-1}$ is also an index of the MCS $s_{j-1}{'} \in \Pi_{j-1}$ that achieves the highest rate $R_{j-1}(s_{j-1}{'}, \overline{\sigma}_{j-1})$ that is smaller than or equal to $B_{j-1}$, then sending TIFR in this manner will also fulfill $$D_{j-1} \le A_j(\overline{\sigma}_{j-1}^F) \text{ for all } j=2,3,\ldots,K+1 \quad (27)$$

which ensures that information bits can flow through each link of the route P without continually accumulating at of the non-starting network nodes $\{v_j\}_{j=2}^K$.

Figure 7A:
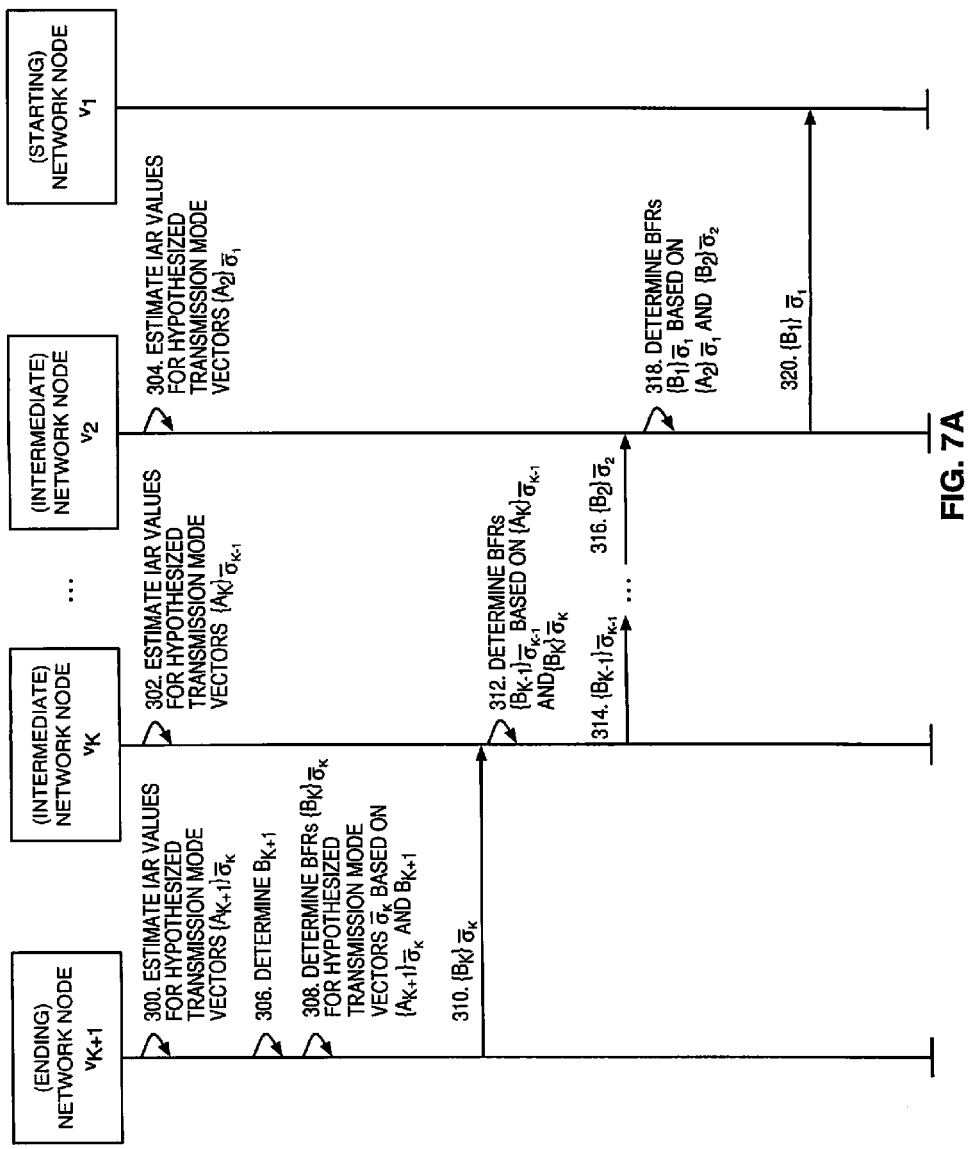
FIGS. 7A through 7C illustrate the operation of network nodes in a route through a wireless mesh network to perform the process represented by the trellis of FIG. 6 according to one embodiment of the present disclosure.
Figure 7B:
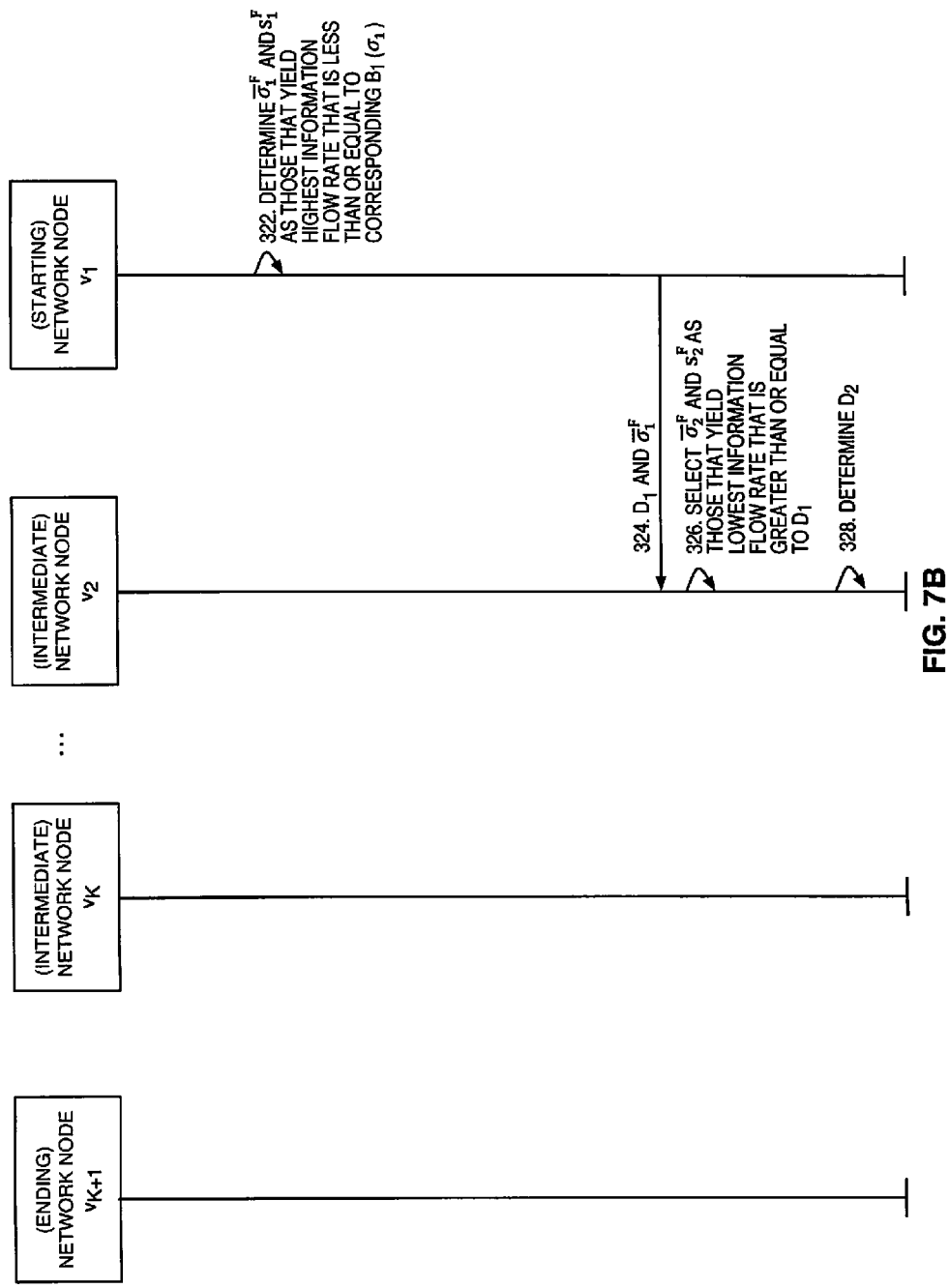
Figure 7C:
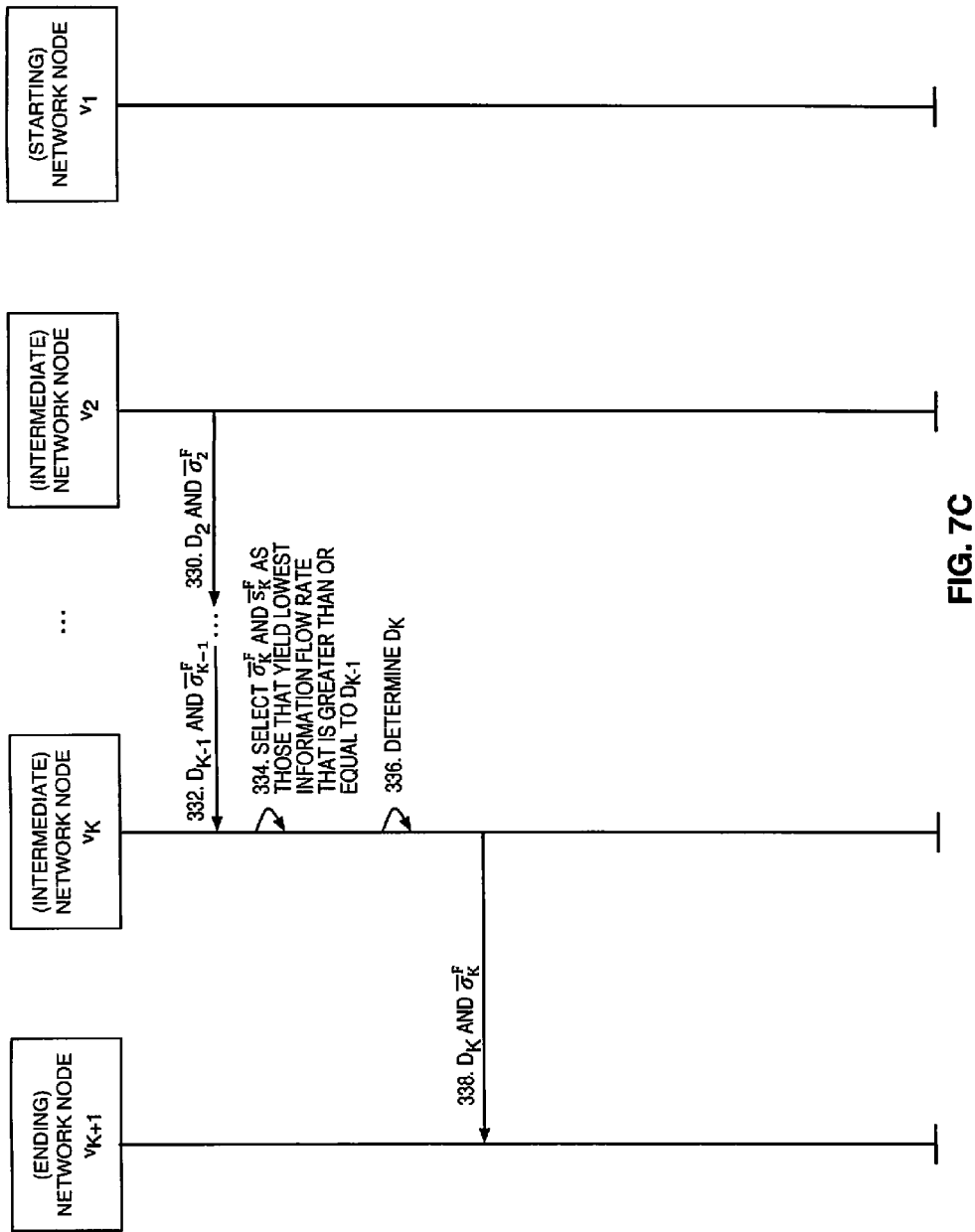

FIGS. 7A through 7C illustrate the operation of the network nodes $\{v_j\}_{j=1}^{K+1}$ in a route $P=(v_1, v_2, \ldots, v_{K+1})$ to perform the process above according to one embodiment of the present disclosure. As illustrated, each non-starting network node $v_j$ estimates the table $\{A_j(\overline{\sigma}_{j-1})\}_{\overline{\sigma}_{j-1}}$ of IARs for its incoming wireless link $(v_{j-1}, v_j)$ according to Equations (16) and (17) (steps 300-304). For each non-starting network node $v_j$, each entry of the corresponding table $\{A_j(\overline{\sigma}_{j-1})\}_{\overline{\sigma}_{j-1}}$ of IARs corresponds to a different hypothesis of the transmission mode vector $\overline{\sigma}_{j-1} \in x_{k=j-p_j}^{j-1+q_j} \Pi_k$. The ending network node $v_{K+1}$ determines a tentative BIFR $B_{K+1}$ for the route P (step 306). As discussed above, the ending network node $v_{K+1}$ determines the tentative BIFR $B_{K+1}$ according to, for example, a rate of information processing or consumption at the ending network node $v_{K+1}$. When there is no limit on the information processing or consumption rate of the network node $v_{K+1}$, the tentative BIFR $B_{K+1}$ may be set to a very large predetermined number.

The ending network node $v_{K+1}$ then determines the table $\{B_K(\overline{\sigma}_K)\}_{\overline{\sigma}_K}$ of new tentative BIFRs for the route P based on the tentative BIFR $B_{K+1}$ and the table $\{A_{K+1}(\overline{\sigma}_K)\}_{\overline{\sigma}_K}$ of estimated IARs at the ending network node $v_{K+1}$ (step 308). More specifically, as discussed above, the ending network node $v_{K+1}$ determines the table $\{B_K(\overline{\sigma}_K)\}_{\overline{\sigma}_K}$ of new tentative BIFRs for the route P according to Equation (18) such that each new tentative BIFR $B_K(\overline{\sigma}_K)$ is the minimum of the tentative BIFR $B_{K+1}$ and the corresponding estimated IAR $A_{K+1}(\overline{\sigma}_K)$. The ending network node $v_{K+1}$ then transmits information indicative of the table $\{B_K(\overline{\sigma}_K)\}_{\overline{\sigma}_K}$ of new tentative BIFRs to its upstream network node $v_K$ (step 310).

The network node $v_K$ then determines a table $\{B_{K-1}(\overline{\sigma}_{K-1})\}_{\overline{\sigma}_{K-1}}$ of new tentative BIFRs for the route P based on the table $\{B_K(\overline{\sigma}_K)\}_{\overline{\sigma}_K}$ of tentative BIFRs received from the ending network node $v_{K+1}$ and the table $\{A_K(\overline{\sigma}_{K-1})\}_{\overline{\sigma}_{K-1}}$ of estimated IARs at the network node $v_K$ (step 312). More specifically, as discussed above, the network node $v_K$ determines the table $\{B_{K-1}(\overline{\sigma}_{K-1})\}_{\overline{\sigma}_{K-1}}$ of tentative BIFRs according to either Equation (19) or Equation (21). The network node $v_K$ then transmits information indicative of the table $\{B_{K-1}(\overline{\sigma}_{K-1})\}_{\overline{\sigma}_{K-1}}$ of new tentative BIFRs to its upstream network node $v_{K-2}$ (step 314). The process continues in this manner such that, after backward propagation of the tentative BIFRs for the route P through zero or more additional intermediate network nodes $v_j$ in the route P, the network node $v_2$ receives a table $\{B_2(\overline{\sigma}_2)\}$ of tentative BIFRs from its downstream network node $v_3$ (step 316). The network node $v_2$ determines a table $\{B_1(\overline{\sigma}_1)\}_{\overline{\sigma}_1}$ of new tentative BIFRs based on the table $\{B_2(\overline{\sigma}_2)\}_{\overline{\sigma}_1}$ of tentative BIFRs and the table $\{A_2(\overline{\sigma}_1)\}_{\overline{\sigma}_1}$ of estimated IARs at the network node $v_2$ (step 318). Again, the network node $v_2$ determines the table $\{B_1(\overline{\sigma}_1)\}_{\overline{\sigma}_1}$ of tentative BIFRs according to either Equation (19) or Equation (21). The network node $v_2$ then transmits information indicative of the table $\{B_1(\overline{\sigma}_1)\}_{\overline{\sigma}_1}$ of tentative BIFRs to its upstream network node, which is the starting network node $v_1$ (step 320).

At this point, backward propagation is complete, and the starting network node $v_1$ then determines the TIFR for the route P at the starting network node $v_1$ (step 322). More specifically, as discussed above, the starting network node $v_1$ determines, for each hypothesis of the transmission mode vector $\overline{\sigma}_1$, an MCS $s_1(\overline{\sigma}_1)$ that yields the highest rate $R_1(s_1(\overline{\sigma}_1), \overline{\sigma}_1)$ that is smaller than $B_1(\overline{\sigma}_1)$ according to Equation (22). The starting network node $v_1$ then determines or selects a final transmission mode vector $\overline{\sigma}_1^F \in \Pi_1$ and a corresponding MCS $s_1^F \equiv s_1(\overline{\sigma}_1^F)$ for the first wireless link $(v_1, v_2)$ as those that yield the highest information flow rate $D_1$ among all possible hypotheses of the transmission mode vector $\overline{\sigma}_1$ according to Equations (23) and (24). As discussed above, the information flow rate $D_1$ is the TIFR for the route P at the starting network node $v_1$. The starting network node $v_1$ then transmits information indicative of the TIFR $D_1$ and information indicative of the final transmission mode vector $\overline{\sigma}_1^F$ to its downstream network node $v_2$ as the forward propagation stage commences (step 324).

The network node $v_2$ then determines or selects the final transmission mode vector $\overline{\sigma}_2^F \equiv \tilde{\sigma}_2^F(\overline{\sigma}_1^F)$ (and thus the final transmission mode $m_2^F \in \Pi_2$ as specified by one of the components of $\overline{\sigma}_2^F$) for the wireless link $(v_2, v_3)$ using the node index table $\{\tilde{\sigma}_2^F(\overline{\sigma}_1)\}_{\overline{\sigma}_1}$ stored at the network node $v_2$ and the corresponding MCS $s_2^F \in \mathcal{M}(m_2^F)$ that yield the lowest information flow rate $R_2(s_2^F, \overline{\sigma}_2^F)$ that is larger than or equal to $D_1$ (step 326). The network node $v_2$ then determines the TIFR $D_2$ (step 328). As discussed above, the TIFR $D_2$ is equal to or less than the TIFR $D_1$. The network node $v_2$ then transmits information indicative of the TIFR $D_2$ and information indicative of the final transmission mode vector $\overline{\sigma}_2^F$ to its downstream network node $v_3$ (step 330). This process continues such that the network node $v_K$ receives the TIFR $D_{K-1}$ and the final transmission mode vector $\overline{\sigma}_{K-1}^F$ from its upstream network node $v_{K-1}$ (step 332).

The network node $v_K$ then determines or selects the final transmission mode vector $\overline{\sigma}_K^F \equiv \tilde{\sigma}_K^F(\overline{\sigma}_{K-1}^F)$ (and thus the final transmission mode $m_K^F \in \Pi_K$ as specified by one of the components of $\overline{\sigma}_K^F$) for the wireless link $(v_K, v_{K+1})$ using the node index table $\{\tilde{\sigma}_K^F(\overline{\sigma}_{K-1})\}_{\overline{\sigma}_{K-1}}$ stored at the network node $v_K$ and the corresponding MCS $s_K^F \in \mathcal{M}(m_K^F)$ that yield the lowest information flow rate $R_K(s_K^F, \overline{\sigma}_K^F)$ that is larger than or equal to $D_{K-1}$ (step 334). In this embodiment, the network node $v_K$ then determines the TIFR $D_K$ and transmits information indicative of the TIFR $D_K$ and information indicative of the final transmission mode vector $\overline{\sigma}_K^F$ to its downstream network node, which is the ending network node $v_{K+1}$ (steps 336 and 338). As discussed above, the TIFR $D_K$ is equal to or less than the TIFR $D_{K-1}$. Since the ending network node $v_{K+1}$ is the last network node in the route P, steps 336 and 338 are optional.

Various extensions may be made to the embodiments disclosed herein. As an example, during the forward propagation, those wireless links that are the bottleneck of the end-to-end information flow rate may be identified and labeled by comparing the TIFR and the maximum information flow rate of a link. More precisely, according to the embodiment of FIGS. 3, 4, 5A, and 5B, a network node $v_j$ is the receiving network node of a bottleneck link if and only if $D_{j-1} \geq A_j - \delta_j$ for some pre-determined small positive number $\delta_j$ (in other words, $D_{j-1}$ is close to $A_j$ within $\delta_j$). Similarly, according to the embodiment of FIGS. 6 and 7A through 7C, a network node $v_j$ is the receiving network node of a bottleneck link if and only if $D_{j-1} \geq A_j(\overline{\sigma}_{j-1}^F) - \delta_j$ for some pre-determined small positive number $\delta_j$. Identifying and labeling these receiving network nodes of the bottleneck link(s) in the route P may be useful in maintaining the choice of transmission modes and MCSs of all other network nodes on the route P. Specifically, when the estimated IAR $A_j$ increases or decreases, the backward and forward propagation may be triggered from the receiving network node of the bottleneck link in order to update all the transmission modes and MCSs on the route P. In one embodiment, for the non-bottleneck network nodes (i.e., the network nodes that are not the receiving network nodes of a bottleneck link(s)), the backward and forward propagation is triggered only if the estimated IAR $A_j$ reduces below the target information flow rate $D_1$.

Figure 8:
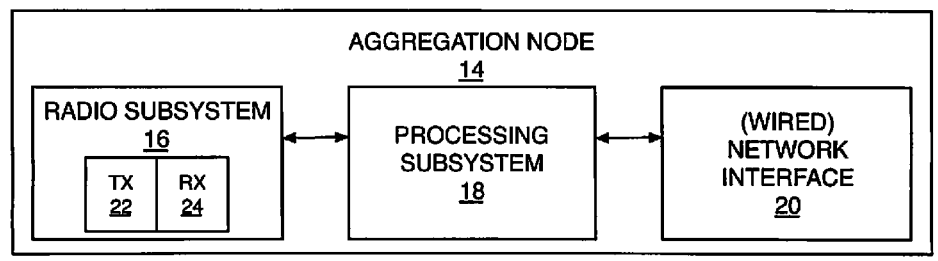
FIG. 8 is a block diagram of the aggregation node of the wireless mesh backhaul network of FIG. 2 according to one embodiment of the present disclosure.

FIG. 8 is a block diagram of the aggregation node 14 according to one embodiment of the present disclosure. As illustrated, the aggregation node 14 includes a radio subsystem 16, a processing subsystem 18, and a network interface 20. The radio subsystem 16 generally includes analog and, in some embodiments, digital components for wirelessly sending and receiving data to and from neighboring access nodes 12. In particular embodiments, the radio subsystem 16 includes a transmitter (TX) 22 and a receiver (RX) 24, which are capable of transmitting suitable information wirelessly to and receiving suitable information from other network nodes. From a wireless communications protocol view, the radio subsystem 16 implements at least part of Layer 1 (i.e., the Physical or "PHY" Layer).

The processing subsystem 18 generally implements any remaining portion of Layer 1 not implemented in the radio subsystem 16 as well as functions for higher layers in the wireless communications protocol (e.g., Layer 2 (data link layer), Layer 3 (network layer), etc.). In particular embodiments, the processing subsystem 18 may comprise, for example, one or several general-purpose or special-purpose microprocessors or other microcontrollers programmed with suitable software and/or firmware to carry out some or all of the functionality of the aggregation node 14 described herein. In addition or alternatively, the processing subsystem 18 may comprise various digital hardware blocks (e.g., one or more Application Specific Integrated Circuits (ASICs), one or more off-the-shelf digital and analog hardware components, or a combination thereof) configured to carry out some or all of the functionality of the aggregation node 14 described herein. Additionally, in particular embodiments, the above described functionality of the aggregation node 14 may be implemented, in whole or in part, by the processing subsystem 18 executing software or other instructions stored on a non-transitory computer-readable medium, such as Random Access Memory (RAM), Read Only Memory (ROM), a magnetic storage device, an optical storage device, or any other suitable type of data storage components.

Lastly, the aggregation node 14 includes the network interface 20 that provides a connection, which is preferably wired, to a network. This network may be the core network of an associated cellular communications network or a public or private network through which the aggregation node 14 is capable of connecting to the associated cellular communications network.

Figure 9:
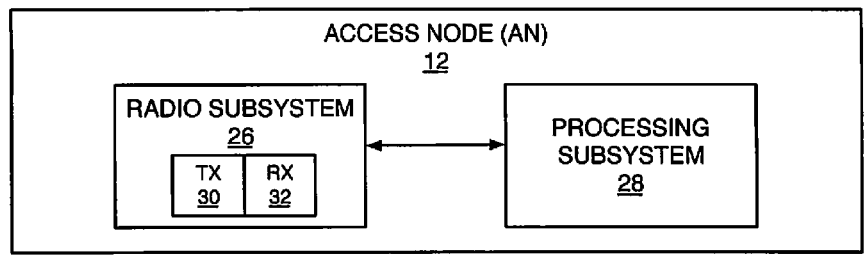
FIG. 9 is a block diagram of one of the access nodes of the wireless mesh backhaul network of FIG. 2 according to one embodiment of the present disclosure.

FIG. 9 is a block diagram of one of the access nodes 12 according to one embodiment of the present disclosure. As illustrated, the access node 12 includes a radio subsystem 26 and a processing subsystem 28. The radio subsystem 26 generally includes analog and, in some embodiments, digital components for wirelessly sending and receiving data to and from wireless devices served by the access node 12 as well as neighboring access nodes 12 (e.g., for wireless self-backhaul). In particular embodiments, the radio subsystem 26 includes a transmitter 30 and a receiver 32 of the access node 12, which are capable of transmitting suitable information wirelessly to and receiving suitable information from other network nodes. From a wireless communications protocol view, the radio subsystem 26 implements at least part of Layer 1 (i.e., the Physical or "PHY" Layer).

The processing subsystem 28 generally implements any remaining portion of Layer 1 not implemented in the radio subsystem 26 as well as functions for higher layers in the wireless communications protocol (e.g., Layer 2 (data link layer), Layer 3 (network layer), etc.). In particular embodiments, the processing subsystem 28 may comprise, for example, one or several general-purpose or special-purpose microprocessors or other microcontrollers programmed with suitable software and/or firmware to carry out some or all of the functionality of the access node 12 described herein. In addition or alternatively, the processing subsystem 28 may comprise various digital hardware blocks (e.g., one or more ASICs, one or more off-the-shelf digital and analog hardware components, or a combination thereof) configured to carry out some or all of the functionality of the access node 12 described herein. Additionally, in particular embodiments, the above described functionality of the access node 12 may be implemented, in whole or in part, by the processing subsystem 28 executing software or other instructions stored on a non-transitory computer-readable medium, such as RAM, ROM, a magnetic storage device, an optical storage device, or any other suitable type of data storage components.

The systems and methods disclosed herein provide many advantages. While not being limited by any particular advantage, some examples of the advantages resulting from embodiments of the systems and methods disclosed herein are as follows. The systems and methods disclosed herein provide mechanisms for selecting and maintaining transmission modes and associated MCSs across multiple wireless links on a given multi-hop route in a wireless mesh network (e.g., a wireless mesh backhaul network) that ensures that the individual information flow rates on different wireless links of the route match well with the maximum achievable end-to-end information flow rate through the route. This minimizes the probability of data loss due to congestion and thus reduces the probability of data re-transmission through upper layer protocol which often results in high latency and substantial signaling overhead.

As another example, some embodiments provide mechanisms for taking into account the potential inter-hop interference from neighboring links of a route during link adaptation. This reduces the probability of over-estimating the feasible transmission rate in each hop. In one embodiment, the mutually compatible transmission modes and MCSs of all access nodes are jointly determined in a distributed manner so that the maximum end-to-end information throughput can be achieved along the selected route without wasteful utilization of valuable radio resources.

The following acronyms are used throughout this disclosure.
16QAM 16 Quadrature Amplitude Modulation
AN Access Node
ARQ Automatic Repeat Request
ASIC Application Specific Integrated Circuit
BIFR Bottleneck Information Flow Rate
CRC Cyclic Redundancy Check
HARQ Hybrid Automatic Repeat Request
IAR Information Arrival Rate
MCS Modulation and Coding Scheme
MMW Millimeter Wave
QPSK Quadrature Phase Shift Keying
RAM Random Access Memory
ROM Read Only Memory
RX Receiver
SINR Signal-to-Interference-plus-Noise Ratio
TCP Transmission Control Protocol
TIFR Target Information Flow Rate
TX Transmitter
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A network node in a wireless mesh network, comprising:
a radio subsystem comprising a transmitter and a receiver; and
a processing subsystem associated with the radio subsystem and configured to:
receive from a downstream network node of the network node in a route through the wireless mesh network, via the radio subsystem, information that is indicative of one or more bottleneck information flow rates determined by the downstream network node for the route;
determine one or more new bottleneck information flow rates for the route based on the one or more bottleneck information flow rates determined by the downstream network node for the route;
transmit to an upstream network node of the network node in the route through the wireless mesh network, via the radio subsystem, information that is indicative of the one or more new bottleneck information flow rates for the route;
receive from the upstream network node, via the radio subsystem, information that is indicative of a target information flow rate for a wireless link from a transmitter of the upstream network node to the receiver of the network node; and
select a Modulation and Coding Scheme, MCS, for the transmitter of the radio subsystem of the network node for use when transmitting information over the route in the wireless mesh network that yield a lowest information flow rate that is greater than or equal to the target information flow rate received from the upstream network node.

2. The network node of claim 1 wherein the processing subsystem is further configured to transmit to the downstream network node, via the radio subsystem, information that is indicative of a target information flow rate for a wireless link from the transmitter of the network node to a receiver of the downstream network node.

3. The network node of claim 2 wherein the target information flow rate for the wireless link from the transmitter of the network node to the receiver of the downstream network node is less than or equal to the target information flow rate for the wireless link from the transmitter of the upstream network node to the receiver of the network node.

4. The network node of claim 3 wherein the target information flow rate for the wireless link from the transmitter of the upstream network node to the receiver of the network node is a function of a final transmission mode and a final MCS of a starting network node of the route through the wireless mesh network, where the final transmission mode and the final MCS of the starting network node are those that yield a highest information flow rate that is less than or equal to a bottleneck information flow rate, B1, for the route determined by a downstream network node of the starting network node and transmitted to the starting network node.

5. The network node of claim 2 wherein the target information flow rate for the wireless link from the transmitter of the network node to the receiver of the downstream network node is equal to the target information flow rate for the wireless link from the transmitter of the upstream network node to the receiver of the network node.

6. The network node of claim 2 wherein the target information flow rate for the wireless link from the transmitter of the network node to the receiver of the downstream network node is equal to a fraction of the target information flow rate for the wireless link from the transmitter of the upstream network node to the receiver of the network node, where the fraction is a function of an information dropping probability of the network node.

7. The network node of claim 6 where in the fraction is equal to $(1-\epsilon j)$, where $\epsilon j$ is the information dropping probability of the network node.

8. The network node of claim 2 wherein the one or more bottleneck information flow rates for the route determined by the downstream network node and the one or more new bottleneck information flow rates for the route determined by the processing subsystem include different values for different interference scenarios.

9. The network node of claim 8 wherein the different values for the different interference scenarios enable joint optimization of MCSs and transmission modes for all wireless links in the route considering the different interference scenarios at each non-starting network node in a plurality of network nodes in the route.

10. The network node of claim 1 wherein the processing subsystem is further configured to:
estimate one or more information arrival rates at the network node for the wireless link between the transmitter of the upstream network node and the receiver of the network node; and
determine the one or more new bottleneck information flow rates for the route based on the one or more information arrival rates for the wireless link between the transmitter of the upstream network node and the receiver of the network node and the one or more bottleneck information flow rates determined by the downstream network node.

11. The network node of claim 10 wherein:
the one or more information arrival rates estimated by the processing subsystem is an information arrival rate, Aj, at the network node for the wireless link between the transmitter of the upstream network node and the receiver of the network node;
the one or more bottleneck information flow rates determined by the downstream network node for the route is a bottleneck information flow rate, Bj determined by the downstream network node for the route;
the one or more new bottleneck information flow rates determined by the processing subsystem for the route is a new bottleneck information flow rate, Bj−1, for the route determined by the processing subsystem based on the information arrival rate, Aj, and the bottleneck information flow rate, Bj; and
the information that is indicative of the one or more new bottleneck information flow rates for the route transmitted to the upstream network node is information that is indicative of the new bottleneck information flow rate, Bj−1, for the route.

12. The network node of claim 11 wherein, in order to estimate the information arrival rate, Aj, the processing subsystem is further configured to:
estimate the information arrival rate, Aj, based on an initial transmission mode and an initial MCS for the transmitter of the upstream network node.

13. The network node of claim 11 wherein, in order to estimate the information arrival rate, Aj, the processing subsystem is further configured to:
estimate the information arrival rate, Aj, based on an initial transmission mode and an initial MCS for the transmitter of the upstream network node that provide a maximum worst-case information flow rate when considering interference from other network nodes in the wireless mesh network.

14. The network node of claim 11 wherein, in order to estimate the information arrival rate, Aj, the processing subsystem is further configured to:
obtain an initial transmission mode and an initial MCS for the transmitter of the upstream network node for the wireless link from the transmitter of the upstream network node to the receiver of the network node as well as an initial transmission mode vector for a number of other network nodes that interfere with the wireless link from the transmitter of the upstream network node to the receiver of the network node, where:
the initial transmission mode vector is a vector of transmission modes for the other network nodes that yields a worst-case information flow rate for the wireless link from the transmitter of the upstream network node to the receiver of the network node for the initial transmission mode of the transmitter of the network node; and
the initial MCS is an MCS from a set of MCSs for the initial transmission mode that yields a maximum information flow rate for the initial transmission mode vector; and
estimate the information arrival rate, Aj, based on the initial transmission mode, the initial MCS, and the initial transmission mode vector.

15. The network node of claim 11 wherein the new bottleneck information flow rate, Bj−1, for the route is a minimum of the information arrival rate, Aj, for the wireless link between the transmitter of the upstream network node and the receiver of the network node and the bottleneck information flow rate, Bj, for the route determined by the downstream network node.

16. The network node of claim 11 wherein the new bottleneck information flow rate, Bj−1, for the route is a minimum of Aj and Bj/(1−εj), where εj is a value in a range of and including 0 to 1 that denotes an information dropping probability of the network node.

17. The network node of claim 10 wherein:
in the one or more information arrival rates estimated by the processing subsystem are two or more information arrival rates, {Aj}σ_j−1, at the network node for the wireless link between the transmitter of the upstream network node and the receiver of the network node for two or more hypothesized transmission mode vectors σj−1, each hypothesized transmission mode vector, σj−1, of the two or more hypothesized transmission mode vectors, σj−1, being a different combination of transmission modes for the upstream network node and one or more other network nodes that interfere with the wireless link from the transmitter of the upstream network node and the receiver of the network node;

the one or more bottleneck information flow rates for the route determined by the downstream network node are two or more bottleneck information flow rates, {Bj}σj, for the route determined by the downstream network node for two or more hypothesized transmission mode vectors, σj, each hypothesized transmission mode vector, σj, of the two or more hypothesized transmission mode vectors, σj, being a different combination of transmission modes for the network node and one or more other network nodes that interfere with the wireless link from the transmitter of the network node and the receiver of the downstream network node;

the one or more new bottleneck information flow rates for the route determined by the processing subsystem are two or more new bottleneck information flow rates, {Bj−1}σ_j−1, for the route determined by the processing subsystem for the two or more hypothesized transmission mode vectors, σj−1, based on the two or more information arrival rates, {Aj}σ_j−1, and the two or more bottleneck information flow rates, {Bj}σ_j;

and
the information that is indicative of the one or more new bottleneck information flow rates for the route is information that is indicative of the two or more new bottleneck information flow rates, {Bj−1}σ_j−1, for the route for the two or more hypothesized transmission mode vectors, σj−1.

18. The network node of claim 17 wherein for each hypothesized transmission mode vector, σj−1, of the two or more hypothesized transmission mode vectors, σj−1, the processing subsystem determines a corresponding new bottleneck information flow rate, Bj−1, of the two or more new bottleneck information flow rates, {Bj−1}σ_j−1, based on a corresponding one of the two or more information arrival rates, {Aj}σ_j−1, for the hypothesized transmission mode vector, σj−1, and one or more of the two or more bottleneck information flow rates, {Bj}σ_j, for the route determined by the downstream network node for one or more of the two or more hypothesized transmission mode vectors, σj, that are consistent with the hypothesized transmission mode vector, σj−1.

19. The network node of claim 17 wherein for each hypothesized transmission mode vector, σj−1, of the two or more hypothesized transmission mode vectors, σj−1, the processing subsystem determines a corresponding new bottleneck information flow rate, Bj−1, of the two or more new bottleneck information flow rates, {Bj−1}σ_j−1, according to:

Bj−1(σ_j−1)=max σ_jϵJ(σ_j−1){min {Bj(σ_j),Aj(σ_j−1)}} where Bj−1 (σj−1) is the new bottleneck information flow rate, Bj−1, for the hypothesized transmission mode vector, σj−1, J(σj−1) is a set of all of the two or more hypothesized transmission mode vectors, σj, that are consistent with the hypothesized transmission mode vector, σj−1, Bj(σj) is the bottleneck information flow rate, Bj, for the route determined by the downstream network node for the hypothesized transmission mode vector, σj, and Aj(σj−1) is the information flow rate, Aj, for the hypothesized transmission mode vector, σj−1.

20. The network node of claim 17 wherein for each hypothesized transmission mode vector, σj−1, of the two or more hypothesized transmission mode vectors, σj−1, the processing subsystem determines a corresponding new bottleneck information flow rate, Bj−1, of the two or more new bottleneck information flow rates, {Bj−1}σ_j−1, according to:

Bj−1(σ_j−1)=max σ_jϵJ(σ_j−1){min {Bj(σ_j)1−εj, Aj(σ_j−1)}} where Bj−1(σj−1) is the new bottleneck information flow rate, Bj−1, for the hypothesized transmission mode vector, σj−1, J(σj−1) is a set of all of the two or more hypothesized transmission mode vectors, σj, that are consistent with the hypothesized transmission mode vector, σj−1, Bj(σj) is the bottleneck information flow rate, Bj, for the route determined by the downstream network node for the hypothesized transmission mode vector, σj, Aj(σj−1) is the information flow rate, Aj, for the hypothesized transmission mode vector, σj−1, and εj is a value in a range of and including 0 to 1 that denotes an information dropping probability of the network node.

21. The network node of claim 17 wherein the processing subsystem is further configured to:
receive from the upstream network node, via the radio subsystem, information that is indicative of a final transmission mode vector, σj−1F, selected by the upstream network node;
select a final transmission mode vector, σjF, and the MCS for the transmitter of the radio subsystem of the network node for use when transmitting information over the route in the wireless mesh network based on the target information flow rate received from the upstream network node and the final transmission mode vector, σj−1F, received from the upstream network node; and
transmit to the downstream network node, via the radio subsystem, information that is indicative of the final transmission mode vector, σjF, and information that is indicative of the target information flow rate for the wireless link from the transmitter of the network node to the receiver of the downstream network node.

22. The network node of claim 21 wherein the target information flow rate for the wireless link from the transmitter of the network node to the receiver of the downstream network node is less than or equal to the target information flow rate for the wireless link from the transmitter of the upstream network node to the receiver of the network node.

23. The network node of claim 1 wherein the processing subsystem is further configured to:
    select a transmission mode and MCS for the transmitter of the radio subsystem of the network node for use when transmitting information over the route in the wireless mesh network that yield the lowest information flow rate that is greater than or equal to the target information flow rate received from the upstream network node.

24. A method of operation of a network node in a wireless mesh network, comprising:
    receiving from a downstream network node of the network node in a route through the wireless mesh network information that is indicative of one or more bottleneck information flow rates determined by the downstream network node for the route;
    determining one or more new bottleneck information flow rates for the route based on the one or more bottleneck information flow rates determined by the downstream network node for the route;
    transmitting to an upstream network node of the network node in the route through the wireless mesh network, information that is indicative of the one or more new bottleneck information flow rates for the route;
    receiving from the upstream network node information that is indicative of a target information flow rate for a wireless link from a transmitter of the upstream network node to a receiver of the network node; and
    selecting a Modulation and Coding Scheme, MCS, for the transmitter of the network node for use when transmitting information over the route in the wireless mesh network that yield a lowest information flow rate that is greater than or equal to the target information flow rate received from the upstream network node.

25. A wireless mesh network, comprising:
a plurality of network nodes in a route through the wireless mesh network, the plurality of network nodes comprising a starting network node for the route, an ending network node for the route, and one or more intermediate network nodes between the starting network node and the ending network node in the route, wherein the plurality of network nodes in the route are configured to:
    determine a bottleneck information flow rate for the route based on backward propagation of information indicative of a bottleneck information flow rate for the route from the ending network node to the starting network node through the one or more intermediate network nodes;
    determine a target information flow rate for the route that is less than or equal to the bottleneck information flow rate for the route; and
    determine a Modulation and Coding Scheme, MCS, for each network node of the plurality of network nodes other than the ending network node based on forward propagation of information indicative of the target information flow rate from the starting network node.

* * * * *